United States Patent
Aggarwal et al.

(10) Patent No.: US 10,853,774 B2
(45) Date of Patent: Dec. 1, 2020

(54) DATA TRANSFER CONTROL BASED ON CONNECTED DEVICE USAGE ANALYSIS

(71) Applicant: The Toronto-Dominion Bank, Toronto (CA)

(72) Inventors: Garima Aggarwal, Toronto (CA); Jonathan K. Barnett, Oakville (CA); Roisin Lara Fritz, Toronto (CA); Robert Kyle Miller, Mississauga (CA); Paul Mon-Wah Chan, Markham (CA); John Jong-Suk Lee, Waterloo (CA); Orin DelVecchio, Richmond Hill (CA)

(73) Assignee: The Toronto-Dominion Bank, Toronto (CA)

(*) Notice: Subject to any disclaimer, the term of this patent is extended or adjusted under 35 U.S.C. 154(b) by 698 days.

(21) Appl. No.: 15/286,094

(22) Filed: Oct. 5, 2016

(65) Prior Publication Data
US 2017/0124541 A1    May 4, 2017

Related U.S. Application Data

(60) Provisional application No. 62/247,951, filed on Oct. 29, 2015.

(51) Int. Cl.
*G06Q 40/00* (2012.01)
*G06Q 20/10* (2012.01)
(Continued)

(52) U.S. Cl.
CPC ........ *G06Q 20/102* (2013.01); *G06Q 20/085* (2013.01); *G06Q 20/145* (2013.01); *G06Q 20/40* (2013.01)

(58) Field of Classification Search
CPC .. G06Q 20/102; G06Q 20/085; G06Q 20/145; G06Q 20/40
See application file for complete search history.

(56) References Cited

U.S. PATENT DOCUMENTS

| | | | |
|---|---|---|---|
| 6,956,500 B1 | 10/2005 | Ducharme et al. | |
| 6,980,973 B1* | 12/2005 | Karpenko | G06Q 20/26 705/412 |

(Continued)

FOREIGN PATENT DOCUMENTS

| | | |
|---|---|---|
| WO | WO01/91073 A1 | 11/2001 |
| WO | WO2010099348 A1 | 9/2010 |
| WO | WO20140151121 A1 | 9/2014 |

OTHER PUBLICATIONS

Liebman; Jeffrey et al., "Do Expiring Budgets Lead to Wasteful Year-End Spending? Evidence from Federal Procurement", Sep. 2013, National Bureau of Economic Research (Year: 2013).*

(Continued)

Primary Examiner — Bruce I Ebersman
(74) Attorney, Agent, or Firm — Fish & Richardson P.C.

(57) ABSTRACT

The present disclosure involves systems, software, and computer-implemented methods for implementing a data transfer control based on information received from connected devices. In one instance, operations include loading an expected usage amount for a group of connected devices. Signals representing actual usage amounts associated with the group are received from at least device in the group. The actual usage amounts can be compared to the expected usage amount. An authorization of at least one payment-related action associated with the at least one group of connected devices is automatically transmitted to a payment system in response to determining that the usage amount is less than or equal to the expected amount, and at least one instruction to perform a corrective action associated with the group is automatically transmitted to at least one connected device of the group in response to determining that the actual amount exceeds the expected amount.

13 Claims, 9 Drawing Sheets

(51) Int. Cl.
*G06Q 20/08* (2012.01)
*G06Q 20/14* (2012.01)
*G06Q 20/40* (2012.01)

(56) References Cited

U.S. PATENT DOCUMENTS

| | | | |
|---|---|---|---|
| 7,657,440 | B2 | 2/2010 | Kuwata et al. |
| 8,140,414 | B2 | 3/2012 | O'Neil et al. |
| 8,275,698 | B2 | 9/2012 | Boss et al. |
| 8,566,227 | B2 | 10/2013 | Carroll et al. |
| 9,500,385 | B2 * | 11/2016 | Weaver ............ G05B 15/02 |
| 10,019,739 | B1 * | 7/2018 | Packer ............ G06Q 30/04 |
| 10,024,564 | B2 * | 7/2018 | Frank ............ G05D 23/1905 |
| 10,061,289 | B2 * | 8/2018 | Haghighat-Kashani ........... G06Q 50/06 |
| 2001/0032109 | A1 | 10/2001 | Gonyea et al. |
| 2001/0049618 | A1 | 12/2001 | Patzel et al. |
| 2002/0005668 | A1 | 11/2002 | Couture |
| 2003/0036918 | A1 * | 2/2003 | Pintsov ............ G06Q 20/04 705/1.1 |
| 2003/0055766 | A1 | 3/2003 | Blanchard et al. |
| 2005/0075975 | A1 * | 4/2005 | Rosner ............ G06Q 40/02 705/40 |
| 2005/0143865 | A1 | 6/2005 | Gardner |
| 2006/0155904 | A1 | 7/2006 | Murakami |
| 2007/0124606 | A1 | 5/2007 | Hsieh |
| 2007/0203860 | A1 * | 8/2007 | Golden ............ H02J 13/0086 705/412 |
| 2008/0096524 | A1 | 4/2008 | True et al. |
| 2011/0046805 | A1 | 2/2011 | Bedros et al. |
| 2011/0218703 | A1 | 9/2011 | Uchida |
| 2011/0307141 | A1 | 12/2011 | Westerlage et al. |
| 2012/0078781 | A1 | 3/2012 | Ross et al. |
| 2012/0191602 | A1 | 7/2012 | Wright et al. |
| 2012/0239595 | A1 | 9/2012 | Kiuchi et al. |
| 2012/0306882 | A1 | 12/2012 | Kashiwagi |
| 2012/0323385 | A1 | 12/2012 | Thiruvengada et al. |
| 2013/0013936 | A1 | 1/2013 | Lin et al. |
| 2013/0030994 | A1 | 1/2013 | Calman et al. |
| 2013/0185437 | A1 | 7/2013 | Willig et al. |
| 2013/0207702 | A1 | 11/2013 | Pal et al. |
| 2013/0346302 | A1 | 12/2013 | Purves et al. |
| 2014/0006329 | A1 * | 1/2014 | Hu ............ G06Q 50/06 706/46 |
| 2014/0180847 | A1 | 6/2014 | Silverstein et al. |
| 2014/0244017 | A1 | 8/2014 | Freiwirth et al. |
| 2014/0244834 | A1 | 8/2014 | Guedalia et al. |
| 2015/0095478 | A1 | 4/2015 | Zuerner |
| 2016/0147205 | A1 | 5/2016 | Kaufman |
| 2016/0170428 | A1 | 6/2016 | Ichien et al. |
| 2016/0337221 | A1 | 11/2016 | Cohen et al. |
| 2019/0334805 | A1 | 10/2019 | Cohen et al. |

OTHER PUBLICATIONS

Quick books Budgeting by Intuit (Year: 2020).*
Accenture, "The Bank of Things—How the Internet of Things will Transform Financial Services," copyright 2014, 12 pages.
Hartman et al., "Smart Meters, Big Data, and Customer Engagement: In Pursuit of the Perfect Portal," Copyright 2014, 11 pages.
LTP Let's Talk Payments, "How to Integrate Payments in IoT Devices?," May 27, 2015, 5 pages.
Pye, "The Internet of Things connecting the unconnected," Engineering & Technology, Dec. 2014, 5 pages.
VUB—Visual Utility Billing, "Power Utility Billing Software Streamlines Your Work," Copyright 2015, 1 page.
Wentzlaff, "The Decision Maker Internet of Things: Retail Banking (Bank of Things)," Feb. 3, 2015, 7 pages.
Kwan et al, "Wireless Sensors with Advanced Detection and Prognostic Capabilities for Corrosion Health Management," Advanced Materials Research, vol. 38, pp. 123-131.

* cited by examiner

DATA TRANSFER CONTROL BASED ON CONNECTED DEVICE USAGE ANALYSIS

CROSS-REFERENCE TO RELATED APPLICATIONS

This application claims the benefit of priority to U.S. Provisional Patent Application Ser. No. 62/247,951, filed on Oct. 29, 2015, the contents of which are hereby incorporated by reference.

TECHNICAL FIELD

The present disclosure relates to computer systems and computer-implemented methods for implementing data transfer control based on information received from a plurality of network-connected devices, in one example where a budget is linked to an associated customer's billing or banking system to pay amounts owed to utility and service companies.

The network of connected devices can include a network of physical objects, or "things," embedded within electronics, software, sensors, and connectivity to enable and achieve greater value and service by exchanging data with the manufacturer, operator, and/or other connected devices or systems. Each device can be uniquely identifiable through its embedded computing system, and can interoperate through the existing Internet or local network infrastructure. In many cases, implementations of the network can provide services including machine-to-machine communications (M2M), such that information received from one machine can influence or modify the actions and activities of other machines.

SUMMARY

The present disclosure involves systems, software, and computer-implemented methods for implementing a data transfer control based on information received from a plurality of network-connected devices. In one example system, the system may comprise at least one processor and a non-transitory computer-readable storage medium coupled to the at least one processor. The medium can store an expected usage amount associated with connected devices and programming instructions for execution by the at least one processor, where the programming instructions instruct the at least one processor to perform operations. The operations can include loading, from the storage medium, an expected usage amount for at least one group of connected devices. Signals representing usage amounts associated with the at least one group of connected devices can be received from at least one connected device in the group of connected devices, where the usage amounts are associated with actual usage amounts of the at least one group of connected devices. The actual usage amounts can be compared to the expected usage amount for the at least one group of connected devices. A signal representing an authorization of at least one payment-related action associated with the at least one group of connected devices is automatically transmitted to a payment system in response to determining that the actual usage amount is less than or equal to the expected usage amount for each of the connected devices. At least one signal representing an instruction to perform a corrective action associated with the at least one group of connected devices is automatically generated and transmitted to at least one connected device from the at least one connected device in response to determining that the actual usage amount exceeds the expected usage amount.

In some instances, the expected usage amount for the at least one group of connected devices is associated with a time period. In some instances, the time period comprises a budgetary period, the at least one group of connected devices is associated with at least one bill for the budgetary period, and each bill is associated with a cost of usage corresponding to the actual usage amounts of the connected devices in the at least one group of connected devices.

In some of those instances, the operations can include allocating funds to a holding account associated with the at least one bill, the allocated funds corresponding to the actual usage amounts, where the allocated funds are automatically disbursed from the holding account to perform payment of the bills in response to the authorization of the at least one payment-related action associated with the at least one group of connected devices. In some instances, funds remaining in the holding account after the automatic disbursement are automatically transferred to a savings or retirement account or are maintained in the holding account for the next budgetary period, wherein the funds allocated to the holding account in the next budgetary period are reduced by an amount corresponding to the funds remaining in the holding account after the automatic disbursement.

In some instances, the operations include generating a notification when the actual usage amount exceeds the expected usage amount in response to determining that the actual usage exceeds the expected usage amount.

In some instances, in response to determining that the actual usage amount is higher than the expected usage amount, the operations include determining at least one action to reduce the actual usage amount in the next time period and presenting the at least one determined action to reduce the actual usage amount to a user associated with the at least one group of connected devices.

In some instances, in response to determining that the actual usage amount is higher than the expected usage amount, the operations include determining at least one action to reduce the actual usage amount in the time period, wherein the at least one determined action includes an operational modification associated with at least one connected device of the at least one group of connected devices and automatically transmitting signals representing instructions to at least one connected device of the at least one group of connected devices, the instructions instructing the at least one connected device to update operations to implement the operational modification. The operational modification may comprise an operational modification causing a reduction in energy usage, which may include one of a delay in operations of the at least one connected device to a time associated with a lower energy cost or a reduction in a power level used by the at least one connected device.

In some instances, the operations further include identifying at least one data source indicating a potential change in an expected usage amount in a particular time period associated with at least one connected device of the at least one group of connected devices and modifying at least one payment-related action for the particular time period based on the potential change in the expected usage amount associated with the at least one connected device. In those instances, the potential change in the expected usage amount is in a future time period, and the potential change is based on an expected usage amount change of the at least one connected device. The at least one data source indicating the potential change in the expected usage amount of the at least one connected device may be at least one of an electronic calendar of a customer associated with the at least one connected device, a weather forecast, information associated with an upcoming season of weather, or historical information on usage during previous times corresponding to the future time period. In other instances, the potential change in the expected usage amount can be associated with a change in the costs of the expected usage amount in a future time period, and the potential change in costs may be based on a change in costs associated with using the at least one connected device. In those instances, the at least one data source indicating the potential change in costs associated with using the at least one connected device may be a futures market for a commodity related to the costs associated with using the at least one connected device or a rate change by a provider associated with the costs associated with using the at least one connected device.

Similar or analogous computer-readable mediums storing non-transitory computer-readable instructions executable by a computer and configured to perform similar operations may be used. Additionally, a computerized method performed by at least one processor can perform these or similar operations.

While generally described as computer-implemented software embodied on tangible media that processes and transforms the respective data, some or all of the aspects may be computer-implemented methods or further included in respective systems, non-transitory, computer-readable medium, or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
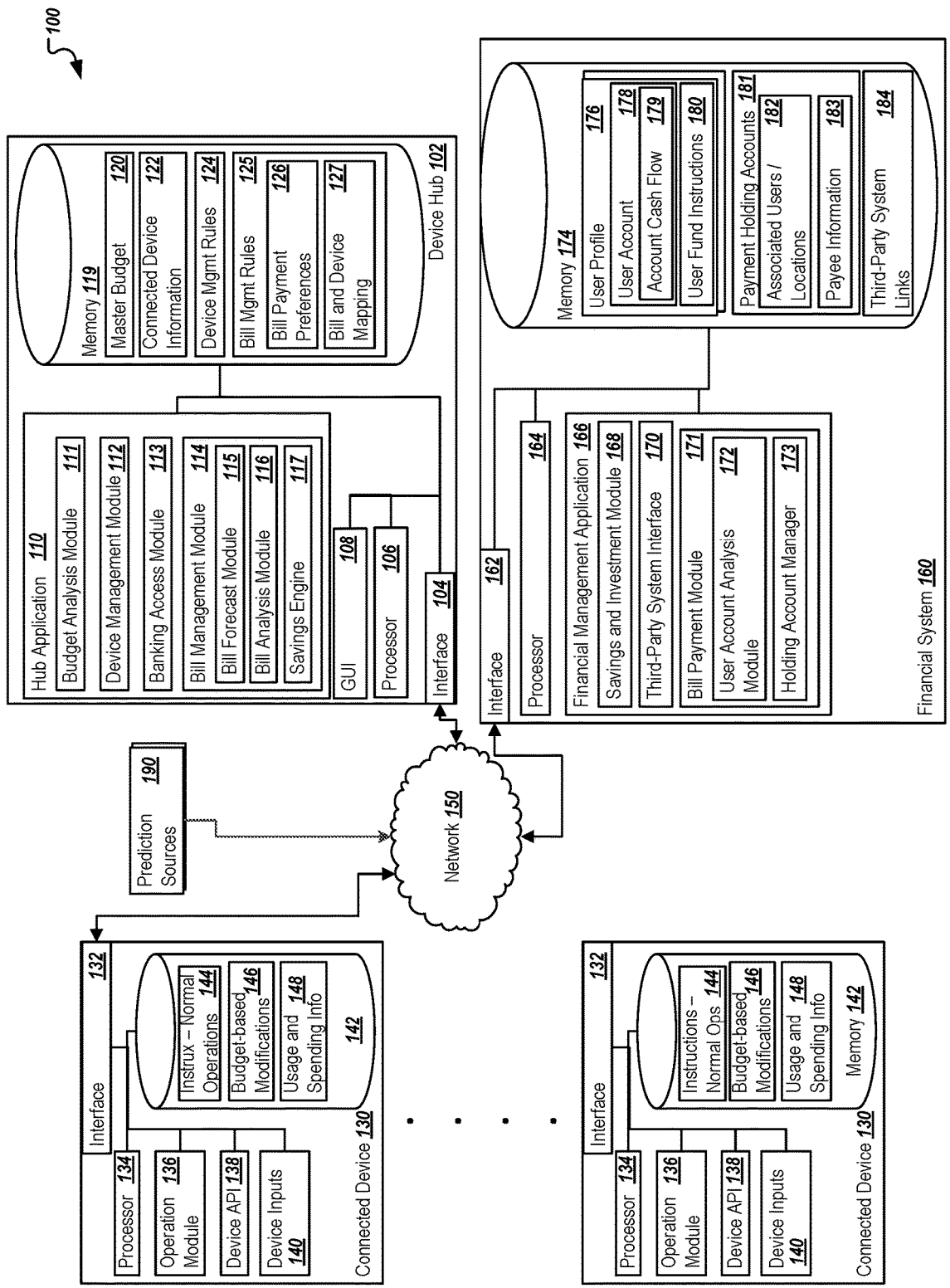
FIG. 1 is a block diagram illustrating an example system for implementing a budget based on information received from a plurality of network-connected devices, where the budget is linked to an associated customer's billing or banking system to pay amounts owed to utility and service companies.

The present disclosure describes systems and methods for managing a budget based on operations and spending associated with a plurality of network-connected devices. Specifically, a centralized network hub and/or connected devices associated with a managed budget allows "smart," or connected, devices to be used in a home, office, or other location to manage spending, modify device operations in response to analyses based on operations and monitoring performed by the connected devices, and subsequently save and/or invest the amount saved through use of the disclosed budgeting processes. Monitored usage and/or cost information can be compared to an expected usage and/or cost amount to determine whether and how a budget is being followed and/or exceeded.

Advancements in home automation and network-connected devices are leading to new interactions and strategies for managing devices and costs associated with them, such as power consumption. The present disclosure and the tools described herein seek to combine a household or business's financial budget with network-connected devices to drive device actions within financial constraints. In some instances, users can grant various permission levels for autonomous or semi-autonomous operations that allow modifications to be made to a first device's operations in light of power consumption or usage of a different, second device. Additionally, device interactions can be used to drive budget parameters and projections.

In the present solution, the master budget is used as a master controller for multiple network-connected devices. In some instances, the master budget and the various interactions can be managed from a network device hub, such as a smartphone, tablet, personal computer, or other similar components. In other instances, a centralized or cloud-based solution can be used. In any instance, component usage and/or spend data can be collected and compared to the master budget. In response to the comparison, different types of budgetary and device actions can be determined and taken. These tools allows previously unrelated and disconnected network-connected devices to be aligned towards a common goal, the financial budget of the household or business.

Additionally, financial objectives could be modified via manual interactions with particular network-connected devices based on suggestions originating from the master budget. For example, a message stating "Agreeing to reduce the temperature by 3 degrees permanently will save $3000 towards your retirement" could be displayed on the thermostat or at a user device, including the network hub. In response to a manual agreement to the change, the master budget and the operational parameters of the particular network-connected device can be modified to reflect the change. In essence, the master budget as applied by a network hub or cloud-based solution can become a governor of the operations of a plurality of network-connected devices. The user can set particular parameters into the master budget, such as preventing the thermostat to be set no less than 65 degrees and no higher than 75 degrees. Further, additional data sources (e.g., additional sensors, third-party input, and other information) can be used to enhance and/or enforce the master budget and operational parameters, such as identifying warmer weather and allowing the thermostat to rely less on the heater by setting the lower end of allowable temperatures to a higher level and/or changing the scheduled heating schedule of the thermostat. Still further, devices outside of the home or office (e.g., wearables, vehicles, etc.) can be used in an extended implementation.

The described system has been adapted to further assist in reducing the number of customer pain points associated with cash management products in a connected location. In current solutions, the bill payment process for a location or property can be time-consuming and difficult to manage. While customers may be able to sign up for automatic payments based on a billed amount for a period through credit or debit withdrawals, customers are still required to review statements to ensure that no billing issues or errors exist, to validate usage based on an expected usage and corresponding budget, to identify potential corrections for future bills, and to settle discrepancies, if needed. The problems of controlling spending associated with bill payments may be exacerbated, particularly when connected devices associated with the location or property are outside of the user's control (e.g., changing utility rates, changing needs based on weather, etc.) or current proximity/location (e.g., a vacation home, a rental property, dependents such as children or related adults living at another location).

The solutions described in this application allow the bill management and payment processes to be enhanced for customers and financial institutions by leveraging a device hub or centralized solution managing and monitoring one or more connected devices at a location with intelligent bill management processes associated with those devices and the location at which the devices operate. Using these components and operations, a seamless bill payment and bill management solution can be offered to customers, reducing errors, providing clearer understanding of bills, and automatically allocating funds for the payment of bills based on pre-authorized payment amounts associated with expected and actual usage. The phrase pre-authorized refers to amounts that, if adhered to based on the customer's usage and associated spending, will be supported and funded by amounts corresponding to a budget defined by the customer. In some instances, the pre-authorized payments may not be associated with a budget, but a planned spending limit based on prior or historical usage.

As will be described, the bill payment management process can be used, along with the device hub and connected devices, to determine bill and payment amounts based on prior, expected, and actual usage of the connected devices. The amounts can be associated with pre-authorized or pre-defined amounts, where the bill management processes can pay those amounts when the actual usage and/or spending during a budgetary or time period falls within or close to the expected parameters. To do so, predefined fund amounts may be automatically placed into a holding account during each period in response to actual or calculated usage and associated spending. When the usage and spending is within the expected amounts and at or under the pre-authorized amounts, the funds can be automatically disbursed to the proper payees (e.g., periodically, in response to events, etc.). Further, any remaining funds from the pre-authorized funds can be applied according to a predefined user preference or instruction. In some instances, some or all of the remaining funds can be transferred to a savings account, provided to a preferred charity, or remain in the holding account to cover potential future overages, as well as other options. Additionally, reward points and/or loyalty incentives may be provided for staying within budget and avoiding overages.

In situations where the actual usage and costs exceed the pre-authorized amounts, the bill management operations can trigger a warning and/or notification to the associated customer(s) of the overages. In some instances, one or more recommendations for resolving those overages can be provided. For covering the additional amount due outside the pre-authorized payments, the system may ask for permission to use additional funds to cover the additional amount. In response to approval from the customer, those funds can then be used to resolve the overage. In some instances, one or more backup fund sources may be used to supply the additional funds, such as a savings account, checking account, investment accounts, or any other suitable source. In addition to identifying how to pay for the overage, the system may identify potential recommendations and/or actions to reduce usage and/or spending over future budgetary periods. These potential recommendations may include a suggestion to change a service or utility provider where lower rates are available. In some instances, different service plans with the same provider may be available and recommended to the customer. In some instances, the system can identify potential actions that can reduce or limit spending and/or usage. These potential actions can be presented to the customer and/or used to automatically change how a particular connected device or set of devices operates. In some instances, the system can determine if the overage is an anomaly or an overage that is likely to continue in future budgetary periods. Where the overage is expected to be a constant overage or to reflect actual spending, the master budget and pre-authorized payments can be adjusted for future budgetary periods.

In some instances, overages may cause partial payments to be made in lieu of full payments. The remaining balance can then be allocated as part of the budget amount for the next budgetary period. This can allow customers to address the over-budget portion of the usage by reducing the next period's budget and/or building in a need for additional cash flow to pay for the overage. One or more priority rules may be defined for the various bills associated with the budget, such that when spending is over-budget, the priority rules can identify which of the bills to pay on a priority basis. For example, a mortgage or rent bill may be paid as a first level of priority, with electric and water bills following in a second level of priority. Third or lower levels of priority may include cable television bills, subscription services, and other non-essential bills.

The bill management system can include a predictive or forecast analysis, where potential or expected modifications to usage and/or spending can be included into the master budget and reflected in the pre-authorized payments. For example, information from one or more data sources can be obtained, and expected changes in usage and/or spending can be predicted. In one instance, weather forecast information can be considered. Where unexpected warm or cold weather is forecast, appropriate changes to expected spending can be determined and the pre-authorized payments and fund transfers can be changed. For example, if a warm front will cause higher temperatures and therefore cause a prediction of increased air conditioning usage, then the master budget portion associated with the air conditioner (e.g., an electric bill) may be increased such that the pre-authorized payments to the corresponding provider (e.g., the electricity provider) are increased based on a calculated additional spend amount. Such information can be provided as a notification to the customer, and may include a recommendation to reduce other usage/spending in a way to offset any expected additional spending. Similarly, other data sources and input may be used to predict and update the master budget and pre-authorized payments. Oil futures, commodity prices, and other market-related information may be used to estimate potential changes in the price of particular services and utilities, such as gas or fuel prices associated with particular bills. Information from one or more providers may be incorporated into the prediction analysis, including announced or expected rate changes to particular services or utilities. Information from government providers and taxing agencies and municipalities may also be incorporated into the analysis, including proposed changes to taxation or rates.

In some instances, the data sources may be associated with the customer themselves, including calendar information providing dates for vacation schedules or scheduling impacts (e.g., planned vacations away from the monitored property, telecommuting, work travel, change in work shifts, etc.). Using this information, a change to an estimated usage and spending may be calculated. That change can then be reflected in the master budget and in the pre-authorized payments to be made. By making the various adjustments based on these predictions, the bill management operations can build deeper intelligence into the system for forecasting, budgeting, and income smoothing operations. With regard to income smoothing, the system may monitor cash flows for the customer in light of potential spending to assist in determining how and when particular bills should be paid, as well as whether notifications of potential insufficient funds from a predefined source should be provided and whether alternative fund sources should be provided or used.

The system further provides the ability for bill management operations to be split among co-inhabitants at a particular property, or for single persons/entities at multiple properties. For co-inhabitants, particular connected devices being monitored and used may be associated with a particular inhabitant/customer. For example, electricity usage at some plugs may be fully associated with a first customer due to the location of the plug being in that person's room or private space. The system can identify this usage as associated with a particular customer and ensure that usage and spending associated with that plug are only allocated to that particular customer. In some instances, such as for common devices and locations, usage and spending may be shared by the co-inhabitants/customers and split evenly or in an alternative split. In instances of multiple inhabitants, the holding fund may be associated with multiple persons/entities, where the bill management operations determine the appropriate amounts of the holding funds to be provided by each respective person. The holding account can then disburse amounts from the combined funds to the associated utility and service bills associated with the property or location to pay the amounts due. Similar to the one person, one location situation above, overages and surpluses can be handled according to predefined rules, including moving funds to savings or another account, identifying recommendations on how to address excess spending, and other actions. Further, in some instances, particular co-inhabitants may be identified as absent or traveling for some or all of the budgetary period. The portion of the budget associated with those customers may be reduced such that the expected usage and spending is modified accordingly. The absence or travel indication may be made explicitly by customers associated with the property, dynamically based on an indication of significantly reduced usage of the devices associated with the absent or traveling customer, or based on location-based tracking of the absent or traveling customer (e.g., via mobile devices associated with the customer, social media information, etc.).

As noted, a single customer (or family or entity) may be associated with multiple locations, such as a primary residence and a vacation home. The master budget can include budgets for both locations, and based on known dates of visiting one location or another, the pre-authorized payments can be modified to reflect the normal usage at one location versus another. A particular holding account can be associated with bills for the multiple locations, and can be used to pay them based on the expected and pre-authorized payment amounts.

Turning to the illustrated embodiment, FIG. 1 is a block diagram illustrating an example system 100 implementing a budget and adjusting spending based on information received from a plurality of network-connected devices, where the budget is linked to an associated customer's billing or banking system to pay amounts owed to utility and service companies. As illustrated in FIG. 1, system 100 is a client-server and device-client system capable of sharing device information across a set of connected devices 130 to a device hub 102, where both the device hub 102 and connected devices 130 may interact with a financial system 160. Specifically, system 100 includes or is communicably coupled with the financial system 160, device hub 102, a plurality of connected devices 130, and network 150, and one or more prediction sources 190. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, financial system 160 may be any computer or processing device such as, for example, a blade server, general-purpose personal computer (PC), Mac®, workstation, UNIX-based workstation, or any other suitable device. Moreover, although FIG. 1 illustrates a financial system 160, financial system 160 can be implemented using two or more systems, as well as computers other than servers, including a server pool. In other words, the present disclosure contemplates computers other than general purpose computers, as well as computers without conventional operating systems. Similarly, each of the connected devices 130 may be considered computers, including functionality and operations specific to the individual device (e.g., a thermostat, security system, water heater, smart plugs, etc.), while the device hub 102 may be a smartphone, tablet, laptop computer, or any other suitable device. Further, illustrated financial system 160, device hub 102, and the plurality of connected devices 130 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the device hub 102 is used to manage, interact with, and otherwise maintain the plurality of connected devices 130 while interacting with the financial system 160 in light of collected data throughout the system. The device hub 102 as illustrated in FIG. 1 contemplates a mobile device, although the device hub 102 may be a relatively stationary device (e.g., a desktop computer), or may be a client for a web- or cloud-based application. The device hub 102 can perform many of the operations directly at the device, while some operations may be performed remotely. The device hub 102 may be a dedicated device associated with the master budget, while in other instances, the device hub 102 may be considered the device hub 102 due to a particular hub application 110 being executed at the device hub 102 that is used to intelligently manage the connected devices 130 and the master budget 120.

The device hub 102 of system 100 includes functionality associated with a bill management device. In the current illustration, these operations (described below) are included within the functionality of the device hub 102 and its hub application 110. In alternative implementations, the bill management operations may be partially or completely performed by a separate component or device within system 100, without departing from the scope of the described solution.

As illustrated, the device hub 102 includes an interface 104, a processor 106, a hub application 110, and memory 119. In general, the device hub 102 is a simplified representation of one or more devices that allow a plurality of network-connected devices 130 to be managed in light of a master budget 120. The device hub 102 may connect directly to the other connected devices 130 via a wireless or wired technology (e.g., via network 150, Bluetooth, Near-Field Communications (NFC), etc.), or the device hub 102 may contact one or more application programming interfaces (APIs) associated with one or more of the connected devices 130. In those instances, particular connected devices 130 may send information associated with their operation to another system, location, or service. The device hub 102, through its functionality, can then connect to those other systems, locations, or services to receive, monitor, and identify usage and operational information regarding those connected devices. Similarly, the device hub 102 can provide instructions to the connected devices 130 either directly via network 150 or through the intermediate connections as described, such as to provide instructions to modify operational parameters associated with a particular connected device 130. In some instances, the device hub 102 may also be a connected device 130 such that the device hub 102's operations are considered and used in interacting with and managing the master budget 120

The interface 104 is used by the device hub 102 for communicating with other systems in a distributed environment—including within the environment 100—connected to the network 150, e.g., connected devices 130 and/or financial system 160, and other systems communicably coupled to the network 150. Generally, the interface 104 comprises logic encoded in software and/or hardware in a suitable combination and operable to communicate with the network 150. More specifically, the interface 104 may comprise software supporting one or more communication protocols associated with communications such that the network 150 or interface's hardware is operable to communicate physical signals within and outside of the illustrated environment 100. Still further, the interface 104 may allow the device hub 102 to create ad hoc or dedicated connections to one or more of the connected devices 130.

Network 150 facilitates wireless or wireline communications between the components of the environment 100 (e.g., between some or all of the other components illustrated in FIG. 1), as well as with any other local or remote computer, such as additional clients, servers, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the device hub 102 itself) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN). Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the device hub 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the device hub 102. Specifically, the processor 106 executes the algorithms and operations described in the illustrated figures, including the operations performing the functionality associated with the device hub 102 generally, as well as the various software modules (e.g., the hub application 110), including the functionality for sending communications to and receiving transmissions from the connected devices 130 and the financial system 160.

The illustrated device hub 102 also includes memory 119, or multiple memories 119. The memory 119 may include any memory or database module and may take the form of volatile or non-volatile memory including, without limitation, magnetic media, optical media, random access memory (RAM), read-only memory (ROM), removable media, or any other suitable local or remote memory component. The memory 119 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the device hub 102. Additionally, the memory 119 may store any other appropriate data, such as VPN applications, firmware logs and policies, firewall policies, a security or access log, print or other reporting files, as well as others. For example, memory 119 can store the master budget 120, connected device information 122, device management rules 124, and bill management rules 125.

The master budget 120 represents a defined budget used to actively manage the operations of a plurality of connected devices 130 in such a way as to maintain budgetary requirements through operational modifications to one or more of the connected devices 130 in response to usage information associated with at least one of the connected devices 130. The master budget 120 may be a user-defined budget, an automatically-defined budget based on usage history or a default usage amount, or a combination thereof. The master budget 120 may be updated after continued usage of the tools described herein, such that auto- and/or manual-adjustments can be made, as appropriate. In one example, the master budget 120 can define a monthly budget for home operations, such as electricity, gas, water, phone, television, and other utilities and services. Each of the budget entries may be associated with one or more connected devices 130, such as a thermostat, shower, refrigerator, phone, etc. The device hub 102, upon establishment of the master budget 120, can connect to data sources associated with each of those connected devices 130 (e.g., the devices themselves or a data source where device information is published), as well as channels to send information and operational instructions back to the connected devices. The master budget 120 may also be associated with expected spending amounts for each budgetary period, where those expected spending amounts can be associated with one or more pre-authorized payments to utility and service providers associated with the billed costs of using various devices. These amounts can be defined or included in a set of bill management rules 125 described below.

The set of connected device information 122 can store and define connection information to each of the connected devices 130, information on the devices 130 themselves, and/or specific information related to the operation of and/or unique features or each device 130. For example, if two or more thermostats are available in a house, one of the thermostats may be defined as a master thermostat, or may be identified as including a GUI capable of delivering messages to users. If a rule requires a user to be contacted via the device, the message may only be sent to the master thermostat having the GUI or display. Similarly, the connected device information 122 may define particular device APIs or addresses at which instructions and messages can be sent back to the devices 130. Memory 119 also includes a set of device management rules 124. The device hub 102 (and specifically, the hub application 110) can use received usage and spending information from various ones of the plurality of connected devices to compare those values to the budget 120 and, subsequently, identify one or more rules (from a set of device management rules 124) to perform and enforce.

The various device management rules 124 can represent a set of logic-based rules for maintaining the master budget 120. The device management rules 124 may be a default set of rules or a customized rule set. The rules may prioritize device usage and/or operations, providing various alternatives, modifications, and permutations of operations to be performed in response to particular actions from one or more of the connected devices 130. In some instances, the priorities may be defined by a user associated with the device hub 102 and/or the environment 100. For example, a user may prioritize the temperature of a home to have a higher priority than the brightness of an adjustable light. In instances where a particular connected device 130 has been used more than budgeted, the device management rules 124 may cause the adjustable light to be dimmed before changing the temperature of the thermostat. The priorities of the device management rules 124 may include a hierarchy or priority of rules and/or devices as defined by the customer. For example, a particular customer may value warmth via a heating system over water temperature. By setting the heater to a higher priority, the device management rules 124, when executed and used, may determine that a water heater's temperature be reduced prior to a reduction in temperature via the thermostat. In a hierarchical rule set, different sets of devices may be prioritized at a different levels, where a device at a relatively lower level will be more likely to be associated with operational modifications than a device at a relatively higher level in the hierarchy. By preparing the prioritized or hierarchical device listing, the customer can define what devices and operations are most important to them, such that the master budget 120 and device hub 102 the priority information into consideration when performing their budget management operations.

Memory 119 further includes a set of bill management rules 125. The bill management rules 125 can define one or more operations and/or rules associated with execution of the bill management module 114 (described below). In particular, the bill management rules 125 can provide instructions on particular fund amounts to be associated with particular connected devices 130 and/or sets of connected devices 130, where those amounts reflect an expected spending amount or value to be used by the customer during a particular budgetary period. In some instances, these amounts may be closely tied to the master budget 120, where the master budget's budgeted usage and spending for particular devices 130 is used as a pre-authorized payment amount to be applied to bills corresponding to the usage of those particular devices 130.

As illustrated, the bill management rules 125 may include a set of bill payment preferences 126 and a bill-to-device mapping 127. The bill payment preferences 126 may include information associated with the customer's preferences for bill payment, including how particular bills are to be paid or how funds are to be allocated based on usage associated with particular bills. In some instances, customers may elect to pay a bill at the end of the budgetary period. The present solution allows the bill management module 114 to move funds from a user account 178 to a payment holding account 181 for future payment of bills associated with particular usage and spending. In some instances, the customer's preferences 126 may cause a lump sum to be moved to the holding account 181 at the beginning of a budgetary period for payment of the bills at the end of the budgetary period. Usage during the period can then be monitored, and any overages or expected overages that may be detected can then sent to the customer for notification. In other instances, funds may be moved from the user account 178 to the payment holding account 181 as usage occurs. For example, if it is determined, or estimated, that usage of a particular set of connected devices 130 was for a particular amount over a day, funds may be moved to the payment holding account 181 to cover that usage. Similar actions can be performed over any intermediate periods throughout the budgetary period, such that only the amount used is placed in the payment holding account 181. In some instances, the bill payment preferences 126 may identify that a particular payee is to be paid in real-time and without transferring funds to the payment holding account 181. In such instances, the bill management module 114 may cause funds to be transferred directly to the particular payee based on an amount estimated to be spent as determined from the monitored usage as identified from the monitored operations of the connected devices 130. In some instances, the bill payment preferences 126 may include one or more priority rules associated with the various bills included in a budget. For example, where actual usage and costs are higher than the expected or budgeted amount for a budgetary period, the priority rules can provide instructions on how and when partial payments are to be made and applied. In one example, various payment tiers and/or hierarchies may be defined in the bill payment preferences 126 such that bills associated with relatively higher tiers and/or hierarchies can be paid first in a partial payment situation. The bills may be associated with default tiers or hierarchical levels, or the tiers/levels may be user-defined. In one example, mortgage and rent payments may be relatively higher, for example, than car, electricity, and water payments, which may in turn be relatively higher than cable television, internet, or phone services. Any number of relative levels may be provided. Alternatively, the bills may be individually scored by a priority score, or may be assigned a location in a priority ladder or other construct. In overage situations, bills can be paid in a descending level of importance or priority. Some or all of the allocated funds for the pre-authorized payments can be used, including by partial payments to one or more of the bills (e.g., minimum payments, a portion of the amount owed, etc.). While the payment holding account 181 is described as a separate account from other user accounts, the payment holding account 181 may be a ledger or a virtual account associated with and possibly included within existing accounts. In those instances, the funds transferred to the payment holding account 181 may be virtually allotted or assigned to the holding account 181 as opposed to having funds transferred between accounts.

In some implementations, each device associated with the master budget can be individually monitored and incorporated into the master budget 120. Additionally, the master budget 120 may include one or more sub-budgets or budget categories in which particular related devices can be combined for budgeting purposes. This grouping can allow customers to manage budgets for related costs, utilities, and general categories. For example, items that use or influence a particular utility bill or resource in common may be grouped, such as a gas oven, gas water heater, and gas heating system. These devices may all be combined into a particular budget category, such that if a decision is made to reduce spending associated with a gas utility bill, decisions as to which of the gas-related devices to modify can be made. Because some devices use two or more types of utility or represent shared costs with different types of devices, a single device may be associated with multiple budget categories. For example, the gas water heater may be associated with both a water budget category and a gas budget category. In some instances, to maintain a particular budget category, operational adjustments can be made to devices associated within the budget category. For example, if both bathroom lighting and shower temperature are in the same category, a relatively long shower may cause certain lights to be dimmed after a budgeted amount of hot water usage is met. Such adjustments can be performed inter- and intra-budget categories, thereby managing the budget to a customer's particular usage.

The budget and usage of certain network-connected devices may be associated with set limits to prevent reducing or increasing spending above those limits. For example, if a determination is made based on the master budget 120 and current spending to reduce a thermostat, the set limits may prevent the thermostat from reducing or increasing the set temperature past certain set limit. These set limits may be default values, values identified based on a location of the managed residence or business (e.g., current or expected weather at the location), or customer-defined values, among others. In instances where an operational rule or adjustment is determined to be made to a device that would cause that device to exceed its set limit, alternative operational modifications to that device or another device may be substituted after further consideration by the master budget 120 and the device hub 102.

Based on minimum settings and set limits for particular devices, the master budget 120 may be limited to a lower bound at which no further reductions can be made. In such instances, a global minimum budget based on the lower bounds of each device can be used to identify the minimum master budget 120 possible. Attempts to reduce particular portions of the budget below any of these minimum amounts may cause a notification to be sent to the customer (e.g., from and/or via the device hub 102) that would indicate such requested reductions were not available. If the proposed modification was to a specific network-connected device 130, an alternative operational modification for a different device may be suggested. In some instances, the alternative operational modification may be to another device within the same budget category as the specific device.

Returning to the bill management rules, the bill and device mapping 127 allows particular connected devices 130 to be mapped to particular bills and payees. In doing so, groups of connected devices 130 associated with a particular bill (e.g., an electricity bill or a water bill) can be grouped such that estimated spending for a particular bill can be calculated based on the usage associated with those mapped devices 130. Additionally, the mapping can allow for splits among multiple customers where spending associated with connected devices 130 associated solely with a particular customer can be correlated to the particular customer, allowing for split of usage and spending between multiple customers, such as in a roommate or co-tenant situation. These mapping may be based on the sub-budget or budget categories described in the master budget 120, or they may be identified outside of the master budget 120, where appropriate.

As noted, the device hub 102 includes the hub application 110. The hub application 110 represents an application, set of applications, software, software modules, or combination of software and hardware used to manage the master budget 120 and operations of the plurality of connected devices 130. In the present solution, the hub application 110, via the operations of the device hub 102, can determine usage or spending information associated with one or more of the plurality of connected devices 130 and adjust operations of at least one of the connected devices 130 in response. In some instances, the hub application 110 may request or cause an operational adjustment of a connected device 130 based on that connected device's own usage information. In other instances, in response to receiving information on a first connected device 130, the hub application 110 may cause operational changes or adjustments to one or more connected devices 130 other than the first connected device 130. In some instances, each master budget 120 may be associated with a period of time or events, also known as a budgetary period. At the end of each period, a determination can be made as to whether the total spending associated with the master budget 120 has been exceeded or whether additional funds are available. If additional funds are available, the hub application 110 can cause the excess and unspent funds to be transferred from a user account 178 at the financial system 160 to one or more savings accounts and/or investment funds. As illustrated, the hub application 110 includes a budget analysis module 111, a device management module 112, a banking access module 113, and a bill management module 114. Additional modules and functionality may be included in alternative implementations. In some implementations, instead of saving or investing funds into an account, at least a portion of the excess and unspent funds may be redistributed into the master budget 120 itself, allowing for additional spending in particular areas of the budget. For example, after a budget period where excess funds remain, customers may choose, for future budgetary periods, to place their thermostat at a more comfortable temperature without the need to modify the operations of another connected device. Alternatively, any set limits to particular devices may be changed to a less strict amount, rules may be modified to allow a wider (or narrower) range of operational modifications for particular devices. The additional spending can be used for future periods of the same budget item or the excess amounts can be used for other budget items. For example, if gas usage was low in a first budgetary period, the excess could be allocated to: 1) savings/investing; 2) a rollover to the next period for increased allowed budget of gas usage; or 3) distributed to cover a water budget overage (either in the current first budgetary period or in future budgetary periods).

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The illustrated modules of the hub application 110 may be combined into a single application or module in some instances. The budget analysis module 111 can request, receive, locate, and otherwise interpret usage and spending information received from or associated with the plurality of connected devices 130. Additionally, the budget analysis module 111 can compare the received or identified information with the master budget 120 to determine relative amounts of usage or spending as compared to previously budgeted amounts. Using that information, the budget analysis module 111 can pass the results to a device management module 112.

The device management module 112 can determine, based on the device management rules 124, one or more actions to be taken with regard to the plurality of connected devices 130. In some instances, instructions to perform a particular action at a particular connected device 130 or set of devices 130 may be identified and transmitted to the appropriate device(s) 130. The hub application 110 can use the interface 104 to communicate with the devices 130.

The banking access module 113 provides a set of financial functionality associated with the hub application 110. The banking access module 113 can correspond with the financial system 160 and link the device hub 102 to a particular user profile 176, in turn associated with one or more user accounts 178. The banking access module 113 may also be used to interact with, define, and modify one or more instructions 180 related to user funds and accounts. When the amount spent over a period is less than a budgeted amount, the banking access module 113 can identify the excess funds and interact with the financial system 160 to move at least a portion of the excess funds to accounts identified by the user using the user fund instructions 180.

The bill management module 114 can perform estimates of an expected usage and spending amount for one or more connected devices 130 during a budgetary period based at least in part on the master budget 120, identify funds to be used to pay that amount, and automatically transfer funds to be used for funding pre-authorized payments for bills corresponding to those one or more connected devices 130 and their associated usage and spending amounts. While illustrated as part of the hub application 110 and the device hub 102, the bill management module 114 may be a separate application from the hub application 110, and may be executed on a device apart or separate from the device hub 102 in other implementations.

The bill management module 114 may be in communication with one or more of the connected devices 130 and/or the other modules in the hub application 110 to identify and/or determine an amount of usage of particular connected devices 130 and the spending amount corresponding to that usage. Based on the known usage patterns of the connected devices 130, the expected spend, and the corresponding bill payees, the bill management module 114 can manage seamless and straightforward bill payment operations. Specifically, based on the known usage and/or the expected spend, the bill management module 114 can cause funds to be transferred from one or more user accounts 178 to at least one payment holding accounts 181. The funds may be made available for payment of the bills corresponding to the usage and spending of the one or more connected devices 130. Multiple bills may be services by the solution, with the payment holding account 181 representing a fund for paying the pre-authorized payments. The bill management module 114 may be associated with or correspond to the expected budgets of the master budget 120, such that the expected usage and spending identified in the master budget may be the pre-authorized payment amount. In some instances, the pre-authorized payment amount may be an aggregation of the budgeted amount for a set of connected devices 130, where each of the connected devices 130 in the set are associated with a particular bill or payee. In some instances, the pre-authorized payment amount used for the bill payments may be more or less than the budgeted amount(s) in the master budget 120.

As illustrated, the bill management module 114 can interact with the financial system 160 to initiate the transfer or movement of funds between the various user accounts 178 and the payment holding account 181. In some instances, funds from outside the financial system 160 may be used or transferred into the payment holding account 181, as necessary. Additionally, information about remaining funds in the payment holding account 181 after payment of the funds may be provided to the bill management module 114, where the remaining funds, or surplus, from the bill pay, may be used or applied according to the bill payment preferences 126 (e.g., moved to savings account, kept in the payment holding account 181 as a buffer for future bill payments, etc.).

The bill management module 114 includes a bill forecast module 115, a bill analysis module 116, and a savings engine 117. The bill forecast module 115 can identify upcoming and predicted changes to the expected bill amounts based on any number of factors, including the current or forecasted weather or season, expected usage based on similarly situated cohorts of the customer, a history of usage associated with the customer, the customer's calendar and upcoming events thereon (e.g., vacation schedule, out-of-office or travel information, work schedule, etc.), as well as market information. In general, the bill forecast module 115 can take information from these sources (i.e., prediction sources 190), and determine or identify potential changes to the usage, and therefore spending, associated with the one or more connected devices 130 associated with various bills and the master budget 120. Based on these predictions, the bill forecast module 115 and the bill management module 114 may provide notifications to the customer of potential or upcoming changes (i.e., both increases and decreases in spending), and may modify both or either of the pre-authorized payment amounts and the corresponding entries in the master budget 120. For example, if a 10-day forecast at the location of the customer's property indicates significantly increased temperatures over a period of time, the estimated usage and spending associated with the customer's air conditioner (and therefore, the electricity bill) may be expected to raise and/or spike during the period. By forecasting this, the bill management module 114 can increase the pre-authorized payment amounts associated with the electricity bill to cover this estimated increase. At the same time, the bill management module 114 and/or the device management module 112 may suggest and/or automatically make one or more changes to the operations of another connected device 130 to offset the increases and keep the overall or specific bill spending, and therefore the payments to be made, at or near the same amount.

The bill analysis module 116 can analyze and review bills received from one or more utility and service providers. In some instances, the bill analysis module 116 can access electronic versions and/or web-based versions of the bills associated with different providers. The bill analysis module 116 can identify usage changes, shifts in usage and spending trends, changes in charges and per-unit pricing, as well as other suitable information obtainable from the bills. Based on changes identified, the bill analysis module 116 and the bill management module 114 can update and/or modify predicted or estimated spending for future billing periods. Based on the changes, recommended changes to usage and/or providers can be identified and provided to the customer. As the illustrated system can monitor usage of particular connected devices 130 and determine an estimated cost associated with that usage, the bill analysis module 116 may also be able to determine whether potential billing errors are present on analyzed bills. For example, if variations above a particular threshold are identified in the expected bill amount as compared to the actual bill amount, a deeper analysis or customer notification may be performed. Therefore, the bill analysis module 116 can identify billing errors immediately upon receipt of the bill and without requiring customers to review the bill prior to payment. In some instances, any bill payment associated with the payment holding account 181 will be held or stopped until any billing discrepancies are resolved.

Savings engine 117 is used to identify potential actions to reduce or maintain a spending amount, particularly based on predicted changes identified by the bill forecast module 115 and/or the bill analysis module 116. In some instances, the savings engine 117 may be able to identify potential options for reducing costs and spending associated with one or more of the connected devices other than those associated with the potential or likely increase. For example, the savings engine 117 may identify potential changes to operations of one or more other connected devices 130 that will reduce usage and/or spending when another connected device 130 is expected to increase its related spending. In other instances, if additional usage of a particular device 130 is expected, the savings engine 117 may identify one or more changes or modifications to reduce or maintain the costs as compared to prior spending before the expected increase. For example, the savings engine 117 may be able to identify potential alternative providers with lower energy rates that may offset an increased energy usage associated with a particular connected device 130, thereby reducing, maintaining, or offsetting the costs associated with the increased energy usage. Alternatively, different rate programs from the same provider may be analyzed, with a recommendation for a rate plan change being suggested or recommended by the savings engine 117. In some instances, the savings engine 117 may be able to recommend replacements of particular devices with one or more efficient devices.

Device hub 102 can also include a graphical user interface (GUI) 108. The GUI 108 interfaces with at least a portion of the environment 100 for any suitable purpose, including generating a visual representation of a web browser and/or the hub application 110. In particular, the GUI 108 may be used to view and navigate various web pages or application functionality located both internally and externally to environment 100, as well as to view and navigate through information accessed by the hub application 110, such as information stored at or associated with the financial system 160 and/or one or more of the connected devices 130, as well as information related to the bill management module 114. Generally, the GUI 108 provides the particular user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with the master budget 120, operations of the one or more connected devices 130, fund instructions 180 associated with user accounts 178 at the financial system 160, or pre-authorized payments and account transfers associated with one or more bills managed by the bill management module 114. The GUI 108 may present information associated with the hub application 110 for viewing and interaction. In general, the GUI 108 is often configurable, supports a combination of tables and graphs (bar, line, pie, status dials, etc.), and is able to allow users to modify instructions, parameters, and settings associated with the hub application 110. Therefore, the GUI 108 contemplates any suitable graphical user interface, such as a combination of a generic web browser, intelligent engine, and command line interface (CLI) that processes information in the platform and efficiently presents the results to the user visually.

The illustrated device hub 102 is intended to encompass any computing device such as a desktop computer, laptop/notebook computer, mobile device, smartphone, personal data assistant (PDA), tablet computing device, one or more processors within these devices, or any other suitable processing device. For example, the device hub 102 may comprise a computer that includes an input device, such as a keypad, touch screen, or other device that can accept user information, and an output device that conveys information associated with the operation of the hub application 110 or the device hub 102 itself, including digital data, visual information, or a GUI 108, as shown with respect to the device hub 102.

As illustrated, the device hub 102 illustrates a single device or component including the full hub application 110 and its related functionality. In other implementations, some or all of the illustrated device hub 102 may be located in or associated with one or more other components, as well as components and/or locations not shown in FIG. 1. For example, the device hub 102 may be a cloud-based component or application. The device hub 102 can manage the master budget 120, the bill management module 114, and the associated rules 124, 125, issuing instructions to the connected devices 130 directly or to a particular device within or associated with the plurality of network-connected devices 130, as well as managing the spending estimates and bill payments associated with the connected devices 130. Restated, some or all of the operations currently illustrated with the device hub 102 may be moved or located at a remote location, including a cloud-based solution. Logic for managing the master budget 120 and determining one or more operational modifications and/or managing the bill management module 114 and associated rules 125 may be managed at the remote or cloud-based location(s). One or more of the connected devices 130 and/or a portion of the illustrated device hub 102 may retain functionality for receiving the instructions from the remote and/or cloud-based solution and relaying those instructions to particular connected devices 130 with which the instructions are associated. In that example, a local device (either a stand-alone device or one of the connected devices 130) may retain the described device management module 112, while the remote or cloud-based solution may manage the other portions of the hub application 110. The connected devices 130 may also use the local device to access and interact with the master budget controller and other logic located at the remote and/or cloud-based solution. In some implementations, the hub application 110 or at least a portion thereof may be managed by and/or executed at the financial system 160. In the cloud-based solution, a corresponding web application and/or mobile app may be used to set and modify operational settings related to the master budget 120. Any suitable combination for managing the master budget 120 to maintain the budget and modify operations of one or more connected devices 130 is contemplated in this disclosure.

The plurality of connected devices 130 may include many different device types, each of which are capable of interacting—either directly or indirectly—with the device hub 102. The connected device 130 illustrated in FIG. 1 is an example of one of any number of variations of connected devices 130, and is meant to be an example device. Alternative, additional, or different components may be associated with and/or included within different implementations.

As illustrated, connected device 130 includes an interface 132, a processor 134, and operation module 136, a device API 138, device inputs 140, and memory 142. The interface 132 and processor 134 may be similar to those of the device hub 102, or they may be different. In general, interface 132 allows each connected device 130 to interact with the device hub 102. In some instances, interface 132 may allow the connected device 130 to directly connect to the device hub 102 either through network 150 or, alternatively, via direct communications with the device hub 102. Processor 134 allows the connected device 130 to execute its base functionality as well as to perform any suitable "intelligent" operations, such as sharing usage and spending information with the device hub 102 and/or receiving instructions to automatically and/or manually modify operations of the connected device 130. The operation module 136 is any application defining and performing the operations associated with the connected device 130. The operation module 136 uses normal operating instructions 144 to perform the standard operations of the device 130 and can provide or make available a set of usage and/or spending information 148. The usage information 148 can track or monitor information based on the usage of the connected device 130, with such information either being made available to the device hub 102 (e.g., via device API 138) or being transmitted to the device hub 102. The device hub 102 can then use that information to compare against the master budget 120 and identify operational adjustments to be made, if any, to one or more connected devices 130. Additionally, the usage and spending information 148 may be used to estimate potential costs associated with the usage and the total bills and owed amounts associated with the usage of the connected devices 130. That information can then be used to determine appropriate pre-authorized payment amounts to be set with the bill management module 114, as well as possible changes in the usage and amounts due for future budgetary periods.

Some connected devices 130 may have their own GUI or display (not shown in FIG. 1). In instances where the instructions are received from the hub application 110 at the connected device 130, the display can provide information as to either suggested manual operational adjustments or information on automatic operational adjustments that may have been made. Users, or customers associated with the connected devices 130, can modify the behavior of the connected device 130 by using existing device inputs 140, such as buttons or other controls available to users. Where a manual operational adjustment is received at the connected device 130 with information on the adjustment presented via the display, the user can actuate the modification using the device inputs 140 as appropriate. In some instances, operational adjustments may be automatic, but may require approval from the user prior to implementing said changes. The approval to make the changes may be presented at the connected device 130 itself, the device hub 102, or at a separate application on any suitable device (e.g., via a smartphone, email application, or web-based hub application, among others). Alternatively, automatic operational adjustments may be performed based on the master budget 120 and/or instructions (e.g., from the device hub 102) associated with a determined way to reduce the spending associated with particular devices 130. In some instances, the automatic operations may include delaying the use of non-essential devices to an optimal time. For example, if an energy plan provides free or lower cost nights and weekends, operations of some connected devices 130 may be automatically delayed or paused from a time before the savings are available to a time after the savings begin. Alternatively, the operations of one or more devices can be modified to a state of operation associated with less energy usage before the savings and restored when savings are present. For example, lights may be dimmed to a lower energy usage operation or computers may operate in a reduced operational state (e.g., shutting down one or more computing cores, reducing screen brightness, turning off peripheral devices, etc.), as well as other energy usage-saving operations, where appropriate.

Memory 142 may be similar to or different than memory 119. As described, memory 142 includes the normal operation instructions 144 and the usage and/or spending information 148. Additionally, memory 142 may include budget-based modification instructions 146. The budget-based modification instructions 146 may be used where specific instructions are not provided by the device hub 102, but instead where information related to budget-based performance is provided. The budget-based modification instructions 146 allow the connected device 130 to intelligently modify its operations based on the budget performance before or in lieu of instructions received from the device hub 102.

As previously noted, each connected device 130 may be different or include different options. In general, the connected devices 130 represent normal appliances, components, or things within a connected environment 100 that can also provide enhanced, intelligent decision-making and/or that can be instructed to modify their behavior in response to an outside influence, such as the hub application 110.

The illustrated financial system 160 represent a system performing financial operations in response to budget analyses performed at the device hub 102. In some instances, the master budget 120 may be maintained at the financial system 160, with information from the various devices 130 being used there to determine operational modifications to be performed. As illustrated in FIG. 1, however, the financial system 160 receives information on budget performance from the device hub 102 to perform particular actions with funds remaining in the budget after periodic analyses. In some instances, the financial system 160 may provide the hub application 110, or alternatively, operations of the device hub 102 may be performed by the financial system 160.

The financial system 160 includes interface 162, processor 164, financial management application 166, and memory 174. Interface 162 and processor 164 may be similar to or different from interfaces 104, 132 and processors 106, 134. Processor 164 executes the financial management application 166, which performs financial operations in response to the budget performance. The financial management application 166 can associate particular device hubs 102 with specific user profiles 176. Each user profile 176 may be associated with one or more user accounts 178 and a set of user fund instructions 180. Based on the budgetary performance reported by the device hub 102, the financial management application 166 can determine the actions to be taken based on the user fund instructions 180. In some instances, the user fund instructions 180 may define rules for how excess budget is to be spend or invested. In some cases, the instructions 180 may direct the financial management application 166 to deposit funds from a primary account associated with the master budget 120 (e.g., one of the user accounts 178) to transfer funds to one or more other user accounts 178. The other user accounts 178 may include a savings account, an investment account, a retirement account, or other suitable accounts. In some instances, excess budget may be applied to credit or debt accounts, such as credit card accounts, student loan accounts, home mortgage accounts, or any other suitable account. A savings and investment module 168 can manage the transfer of funds in many instances, such as when the financial system 160 is associated with a financial institution with whom the user holds an account. The financial system 160 can then implement the defined instructions 180 in response to identifying the excess funds. In some instances, the financial management application 166 may include a third-party system interface 170 for accessing and implementation financial operations associated with the budget performance. Third-party systems may include accounts other than those of the underlying financial institution associated with the financial system 160.

As illustrated, the financial management application 166 also include a bill payment module 171. The bill payment module 171 can perform bill pay-related operations at the financial system 160, including receiving instructions from the bill management module 114 as to how and an amount of funds to be moved from one or more user accounts 178 to payment holding accounts 181. For example, the bill payment module 171 may manage movement of lump or periodic funds from the user accounts 178 to the payment holding accounts 181, where the bill payment module 171 could then apply those funds to one or more bills to be paid by the system. Further, when the bills are to paid, the bill payment module 171 can perform the actual payment of the bills to the correct payees (e.g., based on payee information 183) from the payment holding account 181.

In some instances, the bill payment module 171 may manage payment holding accounts 181 shared by multiple customers, such as in a co-tenant situation, and/or associated with multiple locations. The bill payment module 171 can identify particular holding accounts 181 in which multiple customers are associated based on the user and location information 182 associated with the holding account 181. In those instances, the transfer of funds from user accounts 178 to the holding account 181 may include transfers based on a percentage or portion of the overall bill amounts from multiple user accounts 178 associated with different customers. The bill management module 114 may provide the accurate splits and separation of responsible bill portions, such that the bill payment module 171 can manage the transfer of funds to the appropriate payment holding account 181. Similarly, the bill payment module 171 can associate bills directed to multiple locations and/or properties to a particular holding account 181, where the multiple locations and/or properties are associated with a single customer or customer group (e.g., a family or business). In doing so, bills associated with a set of connected devices 130 at a first location and a set of connected devices 130 at a second location may be combined and associated with the same payment holding account 181, where the bill payment module 171 can pay the various bills from the single location. In additional and/or alternative instances, pre-defined or dynamic rules can be defined where a first customer aggress to pay a first portion of one or more bills, with a second customer or set of customers being responsible for usage over that amount. This ability can, for example, allow parents to assist in supporting children and other family members, as well as to otherwise split costs between customers. Similar rules can allow employers and employees (e.g., in a corporate housing situation), tenants and renters, and other similarly situated groups to combine bill payments while maintaining budgetary certainty for at least one of the entities.

As illustrated, the bill payment module 171 includes a user account analysis module 172 and a holding account manager 173. The holding account manager 173 can perform the operations described above related to the payment holding accounts 181, including managing the transfer of funds to the holding accounts 181 and the transfer of funds from the holding accounts 181 to the various payees. The user account analysis module 172 can perform a separate analysis associated with the funds to be placed into the payment holding account 181. Specifically, the user account analysis module 172 can determine if a cash flow 179 associated with the user accounts 178 is sufficient to cover the funds needed for the pre-authorized payment amounts and the funds to be transferred into the holding accounts 181. In instances where an expected spend is higher than a current cash flow 179 can cover, a notice may be provided to the customer regarding the need for alternative funds to pay the entire set of bills. In some instances, alternative fund sources may be identified with the bill payment preferences 126, where the bill payment module 171 and the holding account manager 173 can access those alternative sources and move the appropriate funds into the holding accounts 181. In some instances, where such cash flow shortfalls are identified, one or more suggestions or recommended changes may be identified by the savings engine 117 to be performed. In some instances, these suggestions may be similar to those generated based on the master budget 120 and device management rules 124. In general, the suggestions are meant to insure that upcoming and expected bills are payable when due, which may include options for reducing spending as is possible. In some instances, the user account analysis module 172 can assist in income smoothing related to payment of the bills, such as when the customer's cash flow varies regularly. In such instances, particular bill payment preferences 126 may be set that allow any excess or surplus funds to be retained or saved for potential cash flow shortfalls or decreases in upcoming budgetary periods. In some instances, a partial payment of the bills may be made, such that alternative funds are not immediately needed to cover the full, over-budget amount. In those instances, the over-budget portion of the bills may be included in the budget for the next budgetary period and can be used to adjust future spending and/or budgets.

Memory 174 may be similar or different than either of memory 119 and memory 142. As described, memory 174 includes the user profile 176 as well as third-party system links 184. The user profile 176 can include an identification of one or more user accounts 178, some of which may be fund-holding accounts, such as a checking or savings account, among others. The user accounts 178 may be managed by the financial system 160, or they may be managed apart from the financial system 160 at a third-party account or institution. The particular user accounts 178 may be merely identified in the user profile 176, where the actual accounts associated with the user accounts 178 are located elsewhere and are accessible based on information stored in the user profile 176.

The third-party system links 184 can provide access information for one or more third-party accounts defined in the user fund instructions 180, and can be used by the third-party system interface 170 to perform the investments or savings as defined by the user. Additionally, the third-party system links 184 can be used to perform actions with surplus funds resulting from spending less than the pre-authorized payment amounts, such that the surplus funds can be used according to the user fund instructions 180 or the bill payment preferences 126 managed by the device hub 102.

Memory 174 also includes or manages the payment holding accounts 181 associated with one or more customers. As described, the payment holding accounts 181 are similar to an escrow account where funds for payment of one or more bills associated with the usage of the connected devices 130 are managed until payment of said bills. The payment holding accounts 181 stored in memory 174 may be the actual accounts in which the money is managed or references to the accounts themselves, such as when the holding accounts 181 are located outside of or remote from the financial system 160.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
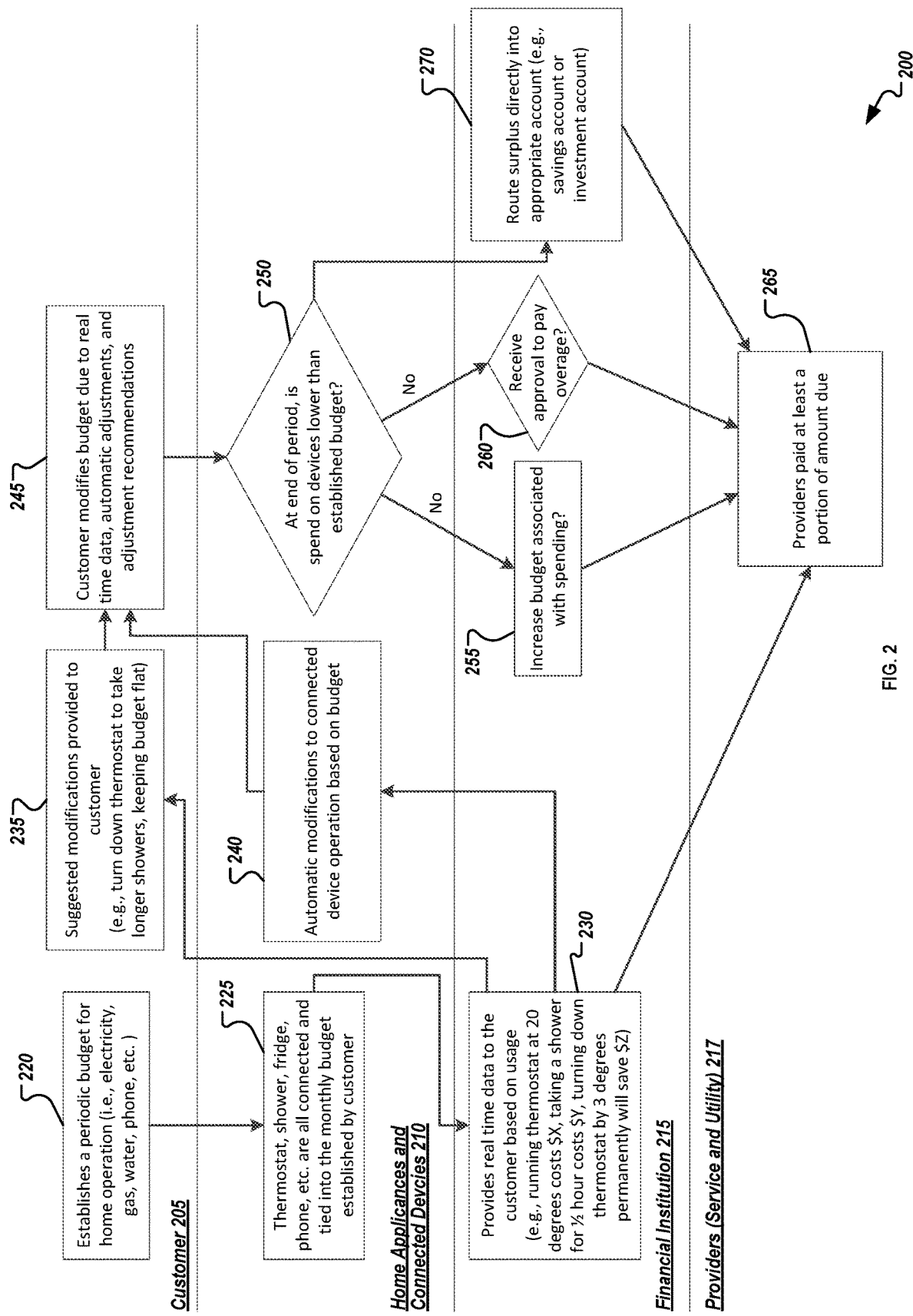
FIG. 2 is a swim-lane diagram illustrating example operations related to implementing and managing a budget and automatically allocating funds to bills and payments pre-authorized by the budget.

FIG. 2 is a swim-lane diagram illustrating example operations related to implementing and managing a budget and automatically allocating remaining funds to bills and payments pre-authorized by the budget. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

FIG. 2 describes an example set of operations across four actors, a customer 205, a plurality of home appliances and connected devices 210, a financial institution 215, and providers 217. Although described in a particular layer, some of the operations may occur at a different layer in particular implementations. Alternatively, some of the operations may occur at multiple layers in other implementations, such that an illustrated operation occurs in multiple steps or actions at two or more layers. Further, in the illustrated example of FIG. 2, the financial institution 215 may directly provide instructions to the home appliances and connected devices 210 and/or the customer 205. The financial institution 215 may manage the analysis and instruction determinations at a device hub (e.g., device hub 102 from FIG. 1), or the analysis and instructions determinations may be made remotely at the financial institution 215.

At 220, a customer 205 can establish a periodic (e.g., a daily, weekly, monthly, or any suitable period) budget for home operations, including, for example, electricity, gas, water, and phone operations. Each of those home operations may be connected to one or more devices or appliances 210, each of those home appliances and devices 210 able to provide information on their usage and/or spending and to receive suggested and/or automated operational modifications from a device hub or the financial institution 215. In association with the budget, one or more pre-authorized payment amounts corresponding to an expected spend for bills reflecting the usage of the one or more devices or appliances 210 can also be set. To fund the pre-authorized payment amounts, funds may be transferred from bank accounts associated with the customer 205 to a holding account at the financial institution 215 (or elsewhere), where the funds in the holding account are used to satisfy the amount due for the bills without requiring the customer 205 to actively perform the payment—the bills can be paid directly from the holding account. In some instances, funds from the customer's accounts can be transferred into the holding account as a lump sum at the beginning of a particular budgetary period, or funds may be transferred periodically or based on monitored usage of the devices and appliances 210.

Once the budget is set, the various home applications and devices 210 are connected to the monthly budget and expected spend information established by the customer 205 at 225. The devices 210 may be individually programmed with specific instructions on how and where to communicate. For example, the devices 210 may be programmed to communicate with a particular device hub (e.g., device hub 102), the financial institution 215, or a website or other location. The communication instructions may allow for two-way (or multi-way) communications so that the financial institution 215 and/or a device hub may provide instructions to the devices 210, where appropriate. In some instances, one or more of the devices 210 may be connected to one or more different ones of the devices 210 such that operations of the one or more and different ones of the devices 210 are symbiotic or otherwise interrelated. In connecting the devices 210 to expected spend information, the devices 210 may also be associated with bills corresponding to their usage, either individually or as part of a larger bill. For example, devices 210 using electricity may be associated with the electricity bill, while devices 210 using water may be associated with the water bill. Some devices 210 (e.g., a dishwasher or washing machine) may be associated with multiple bills, where the usage of both utilities may be monitored and captured by the device 210 during operations.

At 230, the financial institution 215 can provide real-time data to the customer 205 based on the usage and/or spending associated with the usage of the various devices 210. The real-time data can include general suggestions without specific reference to the budget, or specific recommendations for modifying operations of one or more of the devices. The real-time data can include information about current operations of the devices 210 as well as suggestions to the customer 205 as to how funds could be saved, such as "running the thermostat at 70 degrees costs $X," "taking a ½ hour shower costs $Y," and "reducing the thermostat by 3 degrees permanently will save $Z.") The financial institution 215 (or the device hub 102 of FIG. 1) can compare current usage to a budgeted amount to determine whether measures should be taken to manage and maintain the budget. In some instances and as described above, the financial institution 215 (or the device hub 102) may generate one or more suggested modifications and provide them to the customer 205 at 235. These suggestions can be presented at the devices 210 themselves or may be sent to a mobile device, inbox, or other suitable location for the customer 205 to review and, if agreed, implement. Alternatively, the financial institution 215 (or the device hub 102) can provide instructions to one or more of the devices 210 directly to perform automatic operational modifications to bring the master budget into a maintained order, where those devices 210 can perform the automated operational modifications at 240. In another alternative, the financial institution 215 may identify one or more devices 210 associated with higher than expected usage and/or spending during the budgetary period. In those instances, options to identify potential alternative funding sources (e.g., another saving, checking, or investment account) in addition to those used to fund the holding account may be identified, as well as moving additional funds above the pre-authorized payment amounts. These identified amounts and funds may be presented to customer for authorization and approval. In other instances, the system may not identify bill-related changes until after the budgetary period. Where the financial institution 215 determines that the spending amount associated with the monitored usage is on or under budget, at least a portion of the funds associated with the holding account may optionally be paid to the providers at 265 to cover a portion of the expected costs. In some instances, the customer may pay the providers directly instead of via the holding account.

The customer can then reduce their budget and/or increase the funds used to pay potential increases in usage and/or spending based on the real-time data, the automatic adjustments, and the suggested adjustment recommendations at 245. In some instances, the budgeted amounts may stay the same, while the amount actually spent is lowered. Alternatively, additional funds may be allocated to the holding account should increased spending be determined and/or predicted. In some instances, bill pay related modifications may be made at the end of a budgetary period in preparation for the next budgetary period. However, where spending data can be evaluated or estimated, and where that spending data indicates a potential overage or deviation from a pre-authorized payment amount, the system may notify the customer of the potential overage to address the issue as early as possible.

At the end of each budgetary period, a determination as to whether a total spend on the devices 210 is lower than the spending budgeted in the master budget is made at 250. As noted, budgetary periods may be any suitable period of time, including hourly, daily, monthly, or other time periods (e.g., based on billing cycle of utility and service providers 217). In some instances, usage information for particular devices 210 can be used to calculate a spent amount if bills or spending amounts are not readily available. If the total actual spend is less than the budgeted or expected spending associated with funds in the holding account, the financial institution 215 can route, at 270, at least a portion of the spending surplus from the holding account to a savings or investment account of the customer 205, as well as other accounts or uses. Concurrently, the financial institution can also pay the one or more bills associated with the usage from the holding account automatically at 265 without requiring the customer to perform any additional actions. Alternatively, funds may be pushed to the bill issuers of the one or more bills after receiving customer approval of each bill. In other words, while the funds may be added to the holding account, some customer authorization or approval may be required prior to the funds being transferred to pay the actual bills. In another alternative, while funds are transferred to the customer's holding account, the customer may manually initiate payments to the bill issuers instead of automatic payments being initiated. Returning to the illustrated example, in some instances, the customer 205 may have provided instructions on how particular surplus funds are to be deposited or invested, including moving the funds into two or more accounts, including accounts outside of the financial institution 215. In other alternatives, some or all of the excess funds after a budgetary period may remain in the holding account as a buffer for the next budgetary period, or some or all of the excess funds may be used to loosen the budget by reducing set limits on one or more of the connected devices. In doing so, the excess funds may be used to make the next budgetary period more comfortable for the customer by reducing the operational adjustments suggested and/or made by the system moving forward. In some alternatives, a specific savings amount goal may be identified prior to a budgetary period. In those instances, the system can track and modify activities in order to meet the savings amount goal.

When a determination is made that the actual spending and associated bill amounts are or will be higher than the budgeted amount associated with the funds transferred to the holding account, the financial institution 215 can increase the budget and/or funds transferred to the holding account at 255. In some instances, the financial institution 215 may concurrently notify the customer of the overage at 260 and request authorization to pay the overages, either from the accounts used to fund the holding account or from an alternative account. The notification may include, among other items, one or more recommendations for operational modifications, a request to modify the budget for the next period, a notification of operational modifications already automatically performed, or for authorization to allow additional automatic modifications throughout the budgetary period. At 265, providers can be paid at least a portion of the amount due or expected to be due over the budgetary period from the holding account funded during the budgetary period. The holding account can be used to pay a plurality of bills from different providers.

Figure 3:
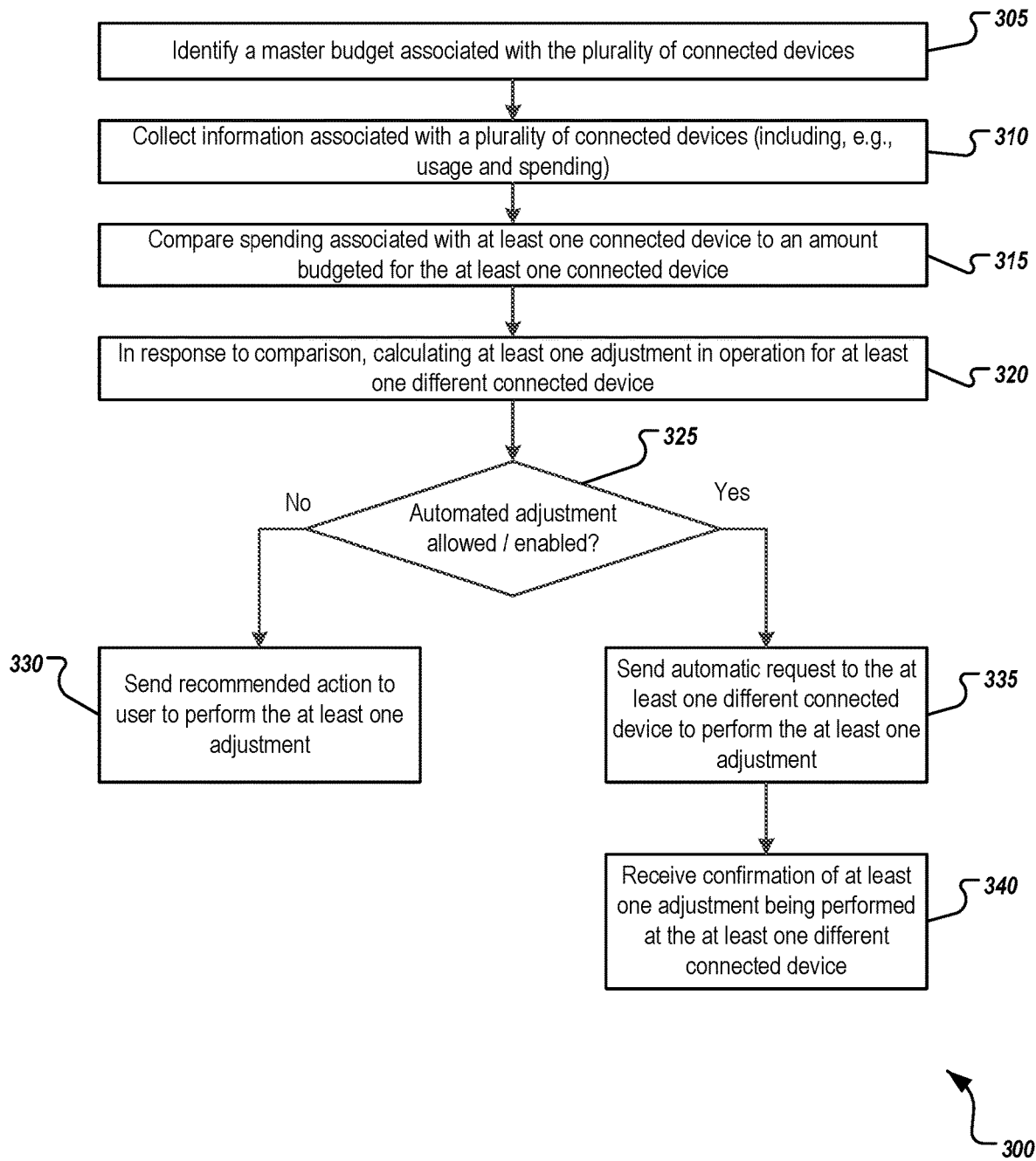
FIG. 3 is a flowchart of an example operation for using a master budget to compare actions performed by one or more network-connected devices and adjusting operations of at least one other network-connected devices based thereon.

FIG. 3 is a flowchart of an example operation for using a master budget to compare actions performed by one or more network-connected devices and adjusting operations of at least one other network-connected devices based thereon. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a master budget associated with a plurality of connected devices is identified. The master budget may be managed at a device hub or mobile device executing an application specifically developed to interact with the plurality of connected devices. Alternatively, the master budget may be maintained at a financial institution of a customer associated with the master budget. The master budget can identify various budgeted usage, bills, activities, or actions associated with the operation of various connected devices. Further, the connected devices are able to share or make available information on the devices' usage and associated costs. In some instances, the devices may determine the costs associated with their operation, while in others, the devices may only provide their usage amounts. For example, a smart thermostat may be able to determine the current outside temperature, the number of hours the air conditioner and/or heater were running, and the temperature to which the thermostat was set. That information may be provided to a system interacting with the master budget to determine the costs associated with those operations. In other instances, particular devices may be able to calculate actual or estimated energy costs based on an amount of power used multiplied by a given rate. The given rate may be identified based on various different determinations. In a first instance, the given rate may be directly provided by or accessible to the customer and system from the third-party bill issuer, such as via a web-based interface, e-bill, or other suitable input. In some instances, one or more APIs may be available at which rate information can be obtained used in the calculations of the actual and/or estimated energy or other usage costs. It is noted that while described herein as an energy cost, usage costs may be associated with other types of usage costs, including data costs in such utilities as a smartphone or internet-related usage data plan, a phone-related calling plan, or other suitable plans. In other words, the actual usage cost may not be based on the energy used, but instead on data, time, or other usage costs. Returning to the rates used to calculate an actual cost, the described system may not be able to identify the current rates for a particular device's usage and cost calculation. In those instances, the system may be able to review historical usage and spending to derive historical rates for the usage. Further, trends in historical rate changes can be identified and used in the derivation of the estimated rate. In some instances, the system may pad or increase the calculated rate to assist in ensuring that the estimated current rate based on historical rates is not under the actual rate. In those instances, for example, a 1-2% increase in the estimated rate can be added to ensure the actual rate is not higher than the estimated rate.

At 310, usage, costs, and/or spending information associated with at least some of the plurality of connected devices is collected. In some instances, the connected devices may provide such information directly to a device or application managing the master budget. In others, the connected devices may provide that information to a third-party or defined repository, at which the device or application can access the information and use in its calculations.

At 315, the actual usage and/or spending and costs associated with at least one connected device is compared to an amount budgeted or expected for the at least one connected device. In some instances, the comparison may occur at regular intervals, such as each hour, each day, each week, etc. Alternatively, the comparison may instead occur in response to events, such as when a certain amount of spending associated with the at least one connected device is reached. The amount may be 25%, 50%, or 75% of the budgeted amount, which may happen at an unexpected time or at a different time during a budgetary period than expected. For example, if usage or spending for a particular connected device reaches 50% of the budgeted or expected amount a week into a monthly budgetary period, one or more adjustments may need to be made.

At 320, at least one operational adjustment for one or more connected devices is calculated in response to the comparison. The at least one operational adjustment may be to operations of the at least one connected device for which usage or spending exceeded the budgeted amount, or alternatively to another connected device among the plurality of connected devices. A defined rule set may be used to determine the appropriate actions to take or recommend in response to the over budget usage of particular connected devices. By prioritizing devices, the rule sets may be able to modify the operations of a device of relatively lower importance or preference while maintaining preferred operational statuses of higher priority devices. Similarly, the rule set may define particular parameters for allowed changes, such as maximum adjustments to thermostat temperatures, water temperatures, relative lighting, and other suitable changes. Further, the rule set may define minimum budgets associated with individual devices, groups of devices, and/or the collective plurality of devices. Based on requirements of the living and/or working conditions of the household or business associated with the master budget, minimum budgets for individual devices, related groups of devices, and/or all of the plurality of connected devices may be defined, where the minimum budget equals the minimum cost of the amount needed to run the devices at their minimum required levels. These rule sets may be defined and updated by users, or they may be default settings associated with the devices or scenario. The rule sets may also determine whether calculated operational adjustments are allowed to be performed automatically or if suggestions must be passed to the customer before their implementation. The rule set can determine what is allowed automatically and what requires customer approval and/or customer action.

At 325, a determination is made as to whether an automated adjustment is allowed and/or enabled. In some instances, particular connected devices may not be able to automatically modify operations, instead requiring the customer to manually perform the action. Additionally, customers may limit via the rule set which adjustment can be performed automatically and which are not, including amounts of automatic adjust allowed before manual approval is required to adjust further.

In response to a determination that automated adjustments are not allowed or enabled, method 300 continues at 330 where the recommended action is sent to the customer suggesting that the at least one adjustment is performed. The suggestion may be sent to a display on the particular connected device associated with the adjustment, to another device used by the customer, such as a smartphone or tablet via a notification, or via email or other messaging technology. The customer can then choose whether to accept or reject the change, either by activating a corresponding button or menu item through the presentation (and thereby authorizing the operational adjustment), or by manually using inputs on the corresponding connected device to make the change. In some instances, the customer may choose to perform a partial adjustment, such as changing the thermostat by 2 degrees instead of the suggested 3 degrees. Alternatively, if the user chooses not to perform the suggested change, method 300 may return to 320 to determine an alternative operational modification that could be made.

In response to a determination that an automated adjustment is allowed and enabled at the connected device(s) associated with the calculated operational modification, method 300 continues at 335. At 335, a request to perform the automatic adjustment is sent to the connected device, which may be different than the connected device associated with the budget overage. At 340, a confirmation that the at least one automatic adjustment is performed at the connected device is received. This confirmation can be reported back to the customer. In some instances, the customer may be given an opportunity to reverse the automatic modification.

Figure 4:
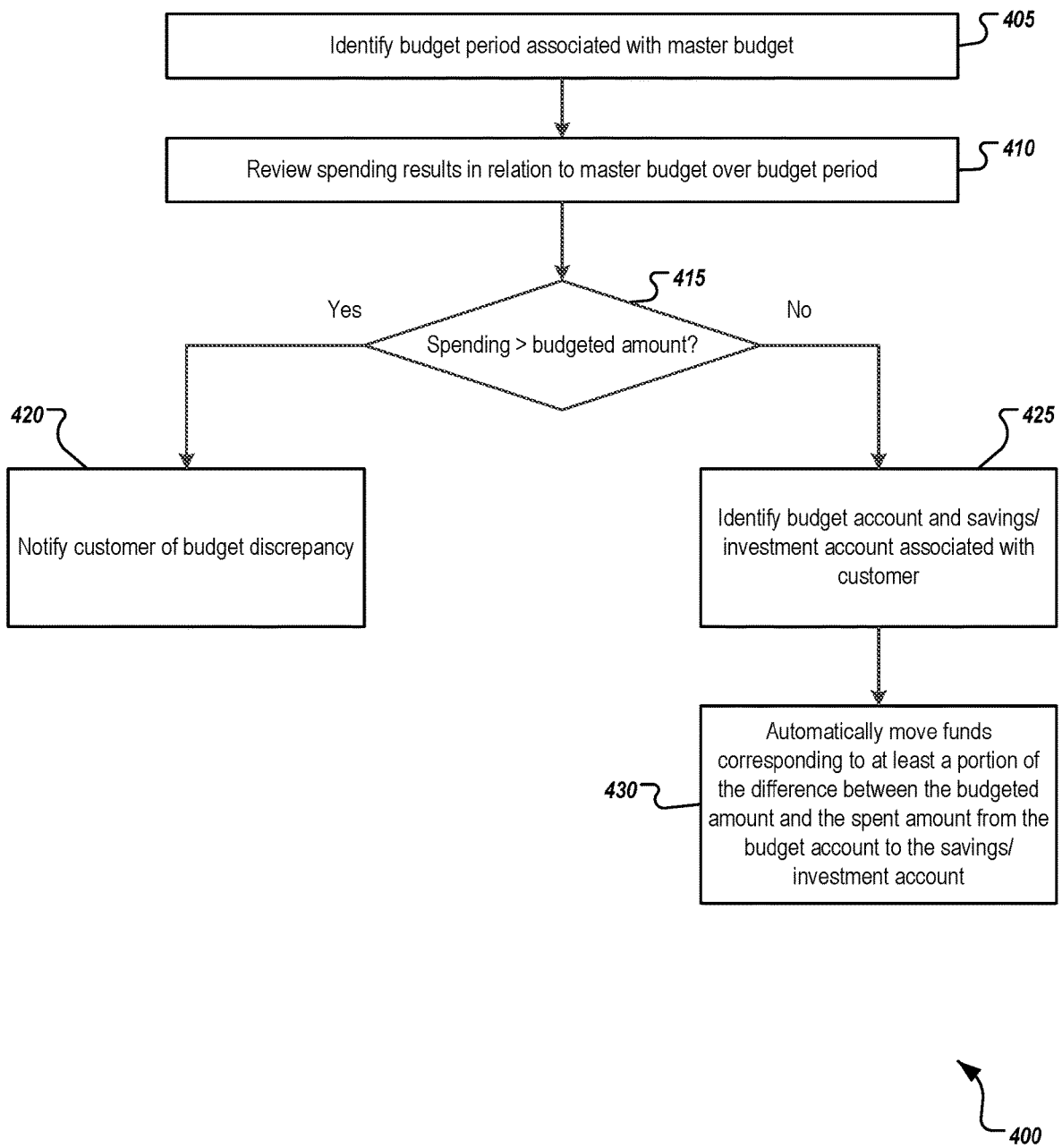
FIG. 4 is a flowchart of an example operation for automatically saving or investing excess funds remaining from a master budget at the end of a budget period, where the funds to be saved or invested represent at least a portion of a difference between an actual spending amount and a budgeted spending amount.

FIG. 4 is a flowchart of an example operation for automatically saving or investing excess funds remaining from a master budget at the end of a budget period, where the funds to be saved or invested represent at least a portion of a difference between an actual spending amount and a budgeted spending amount. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a budget period associated with the master budget is identified. The budget period may be a regular interval, such as week, month, or quarter. Alternatively, the budget period may be associated with particular events or occurrences. At 410, spending results for the plurality of connected devices are reviewed in relation to the master budget at the end of each budget period.

At 415, a determination is made as to whether the usage or spending over the budget period is greater than the usage or spending amount budgeted for the master budget. If so, method 400 continues at 420, where a notification of the overage is provided to the customer indicating the budget discrepancy. In some cases, the notification can include one or more recommendations to reduce usage or spending permanently, including actions and changes to settings associated with one or more of the connected devices.

If a determination is instead made that the used or spent amount is less than the budgeted amount, method 400 continues at 425. At 425, budget accounts (e.g., a checking account) and savings and/or investment accounts associated with the customer are identified. Additionally, one or more savings/investment rules are identified to determine how any excess funds are to be used. At 430, funds corresponding to at least a portion of the difference between the spent amount and budgeted amount can be moved to the identified savings and/or investment accounts according to the defined rules. Any suitable combination of savings and investments can be used, as well as fund transfers to non-savings and non-investment accounts, such as student loans, mortgage accounts, credit card accounts, or other suitable accounts. As described above, one alternative to moving funds to particular accounts may be to use some or all of the excess funds to provide a budgetary cushion for the next period, or to adjust settings within the master budget to a more comfortable level. For example, parameters for suggesting or making an operational adjustment to a thermostat may be lessened and/or made less reactive, allowing the temperature to stay at a lower temperature in the summer or a higher temperature in the winter as compared to previous months where the thermostat may be changed sooner in reaction to other device-related spending.

Figure 5:
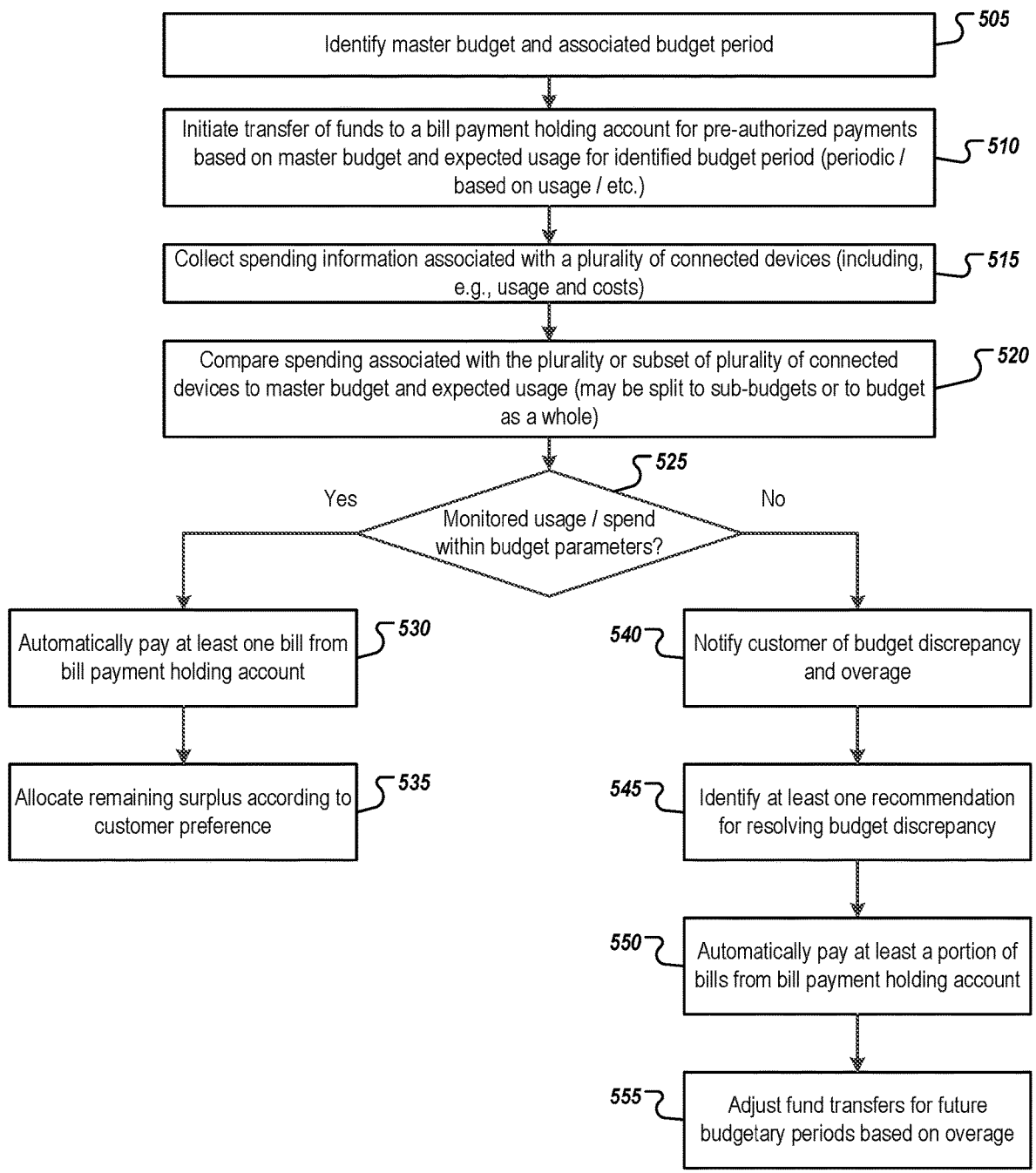
FIG. 5 is a flowchart of an example operation for automatically allocating funds from a customer account to a bill holding account for payment of at least one pre-authorized bill.

FIG. 5 is a flowchart of an example operation 500 for automatically allocating funds from a customer account to a bill holding account for payment of at least one pre-authorized bill. For clarity of presentation, the description that follows generally describes method 500 in the context of the system 100 illustrated in FIG. 1. However, it will be understood that method 500 may be performed, for example, by any other suitable system, environment, software, and hardware, or a combination of systems, environments, software, and hardware as appropriate. Additionally, operations associated with methods 300 and 400 may be performed concurrently with the operations described here with regard to method 500. Alternatively, method 500 may be performed in systems without performing methods 300 and 400, or derivations therefrom.

At 505, a master budget is identified along with an associated budget period. The master budget may be associated with a set of expected spending based on expected usage of the one or more connected devices. In particular, the master budget may pre-authorize payments to pay for one or more bills associated with the one or more connected devices, such as a water, electricity, or other utility or service bill. In association with those pre-authorized payments, funds may be proactively transferred from a customer account associated with the bills to a holding account, from which the bills can be paid at or before their due date.

At 510, a transfer of funds to a bill payment holding account is initiated based on the master budget and the expected usage and/or spending for the identified budget period. While illustrated as a single action (e.g., a lump sum of funds being transferred), various time frames for transferring funds to the holding account can be used. In some instances, funds may be transferred as information on additional usage and/or spending is received from the connected devices themselves. In such instances, the transfer of funds may be in near real-time, such that funds are transferred to the holding account in response to usage and/or spending associated with the usage. In other instances, funds may be transferred on a periodic basis (e.g., daily, weekly, bi-weekly, etc.), or in response to incoming cash flow events for the customer.

At 515, spending information associated with the plurality of connected devices can be collected. The spending information may identify usage information of the connected devices, where the spending information is derived from or estimated based on the collected usage information. At 520, the spending information is compared to the master budget and the expected usage associated with the pre-authorized payments and the corresponding fund transfers. In some instances, the spending information may be grouped by particular bills (e.g., usage and/or spending information of connected devices impacting an electricity bill may be considered separately from usage and/or spending information of connected devices associated with a water bill). The aggregated spending, spending associated with related bills, and/or individual spending for particular connected devices may be compared to the master budget and pre-authorized payments.

At 525, a determination is made as to whether the monitored usage and spending is within the budget parameters. Specifically, the determination may be whether the actual amount usage and/or spend is higher or lower than the budgeted usage and/or spending amount associated with the pre-authorized payments and the funds transfer. If a determination is made that the actual spent amount is within the budget parameters, method 500 continues at 530, where at least one bill is automatically paid with funds from the holding account. At 535, any remaining surplus of funds within the holding account may be allocated according to the customer's preference. Those allocations may include, but are not limited to, allocating the funds within the holding account as a buffer for future budgetary periods, transferring funds to another account (e.g., a savings or checking account), transferring funds to an investment or retirement account, or any other suitable allocation.

If, however, it is determined that the monitored usage is outside of the budget parameters, method 500 continues at 540. At 540, the customer can be notified of the budget discrepancy and the identified overage. At 545, at least one recommendation for resolving the budget discrepancy may be identified. In some instances, the at least one recommendation may include a recommend source for additional funds to be used in paying the bills above budget parameters. In other instances, the recommendation may be suggestions or recommendations on ways to modify usage and the master budget based on an analysis of current usage. For example, if an electricity bill is higher than expected, the recommendation may include a suggestion to modify the settings on a thermostat that can lessen electricity usage by setting a revised schedule based on the customer's time at the property. In still other instances, the recommendation may be associated with a budget and pre-authorized payment adjustment to account for future spending similar to the overages identified during the current budgetary period.

At 550, at least a portion of the bills may be automatically paid from the holding account. For example, the bill amounts within the expected spending amount may be paid, while the additional portions are paid for by an alternative option. In some instances, the recommendations of 545 may identify potential fund sources for payments associated with the overage, and at 550, one or more of those potential fund sources may be used to pay the remaining portion of the bills. At 555, fund transfers for future budgetary periods may be adjusted based on the determined overage and, in some cases, after customer approval of the increase. In some instances, and while not shown in the illustration of FIG. 5, the fund transfers may be reduced where the actual spending amount is less than the budgeted amount and the pre-authorized payments, such as where a determination is made that the estimated future spending amount will continue to be less than the amount budgeted for the fund transfers to the payment holding account.

Figure 6:
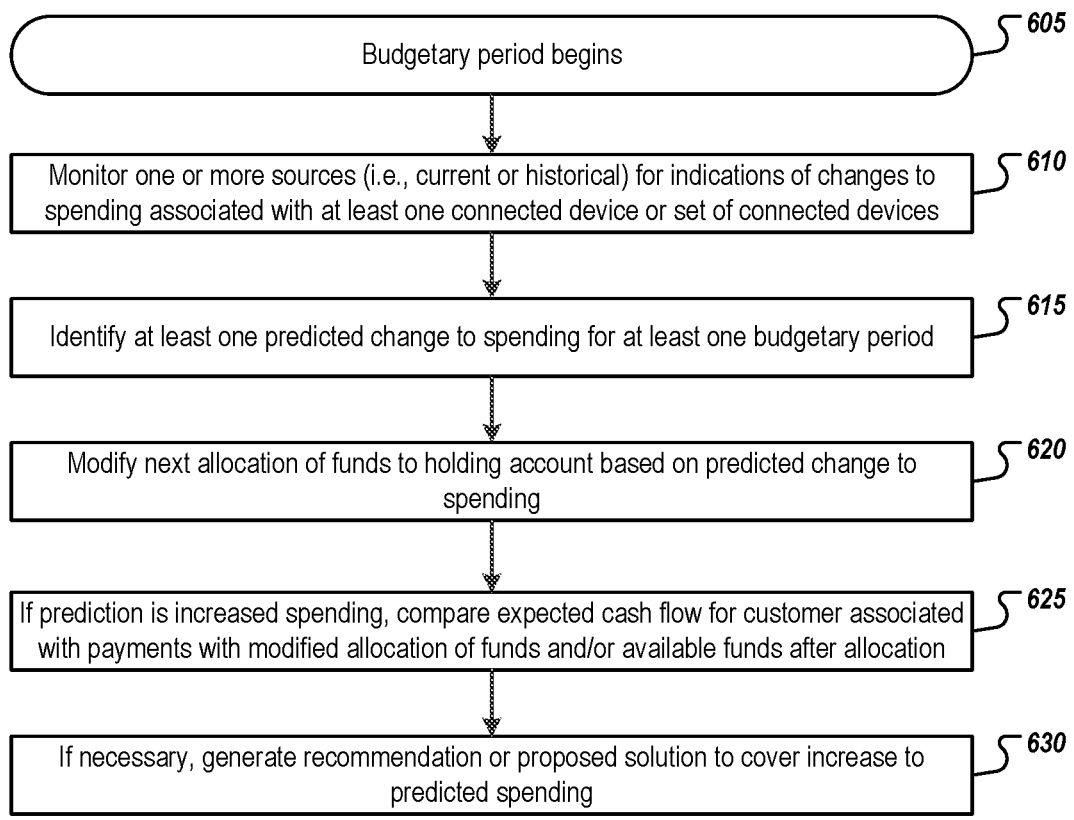
FIG. 6 is a flowchart of an example operation for monitoring data sources for at least one predictive event or action to determine expected changes to at least one bill associated with the master budget.

FIG. 6 is a flowchart of an example operation 600 for monitoring data sources for at least one predictive event or action to determine expected changes to at least one bill associated with the master budget. For clarity of presentation, the description that follows generally describes method 600 in the context of the system 100 illustrated in FIG. 1. However, it will be understood that method 600 may be performed, for example, by any other suitable system, environment, software, and hardware, or a combination of systems, environments, software, and hardware as appropriate. Additionally, operations associated with any of the other described methods may be performed concurrently with the operations described here with regard to method 600. Alternatively, method 600 may be performed in systems without performing the other described methods, or derivations therefrom.

At 605, a budgetary period associated with the pre-authorized payments and fund transfers to the holding account begins. As the budgetary period continues, one or more data sources are monitored at 610 for indications of changes that may potentially affect the amount of spending that will associated with usage of at least one connected device or a set of connected devices. The data sources may be any suitable data source, and can include general data sources that are not directly related to the bills to be paid themselves, as well as data sources specific to the providers associated with the bills. For example, the data sources used in predicting changes to the expected spending may include a weather report, information on seasonal changes, information related to calendar information for the customer (e.g., scheduled vacations away from a monitored property, changes in work or shift hours, business travel, etc.), market information on the price of particular commodities or resources associated with a particular bill (e.g., price of coal, oil, etc.), and information identifying changes to a billing price or structure for utility or service usage associated with particular connected devices, as well as other suitable information. Additionally, data associated with historical usage of the customer as well as other similar or similarly-situated customers can be used to predict future modifications to usage and expected spending.

At 615, at least one predicted change to an expected usage and/or spending amount for at least one budgetary period is identified. The at least one predicted change may be based on an increased (or decreased) cost associated with usage as compared to the currently expected costs, where the same usage is expected to result in higher (or lower) spending. Additionally, the at least one predicted change may be based on an expected change in a usage amount, either increased or decreased, of one or more particular connected devices. In some instances, a combination of changes to both usage and cost per usage may be considered in identifying and determining predicted changes to the expected spending amount.

At 620, the next allocation of funds to the holding account may be modified based on the predicted change in spending. In some instances, the modification may be made in the same budgetary period (e.g., where ongoing transfers from the customer's account to the holding account are made) such that the funds in the holding account are modified to match the predicted change in spending. In other instances, the modification may be made in the next budgetary period. In those instances, any surplus or shortage of funds in the holding account during the current budgetary period can be managed as described herein, such as to apply the surplus as defined or to identify additional funds to cover the shortage.

At 625, in situations whether the predicted spending trend is an increase in the expected spending amount, an expected cash flow for the customer associated with the pre-authorized payments may be compared to the predicted increase and any associated increase in the transfer of funds from the customer's accounts to the holding account. If the comparison indicates that funds from a primary account from which the funds are typically transferred from is not enough or is higher than expected, at 630, one or more recommendations or proposed solutions to cover that identified increase to predicted spending may be generated and, in some instances, provided to the customer for approval. In some instances, the recommendation or solution may be pre-authorized by the customer's preferences, such that changes may be automatically made without requiring authorization before doing so. In those cases, a notification may be provided to the customer of the changes, allowing the customer to modify those changes in funding strategies after they are automatically made. Alternatively or additionally, one or more of the recommendations or proposed solutions identified at 630 may be to change usage or spending associated with one of the other connected devices or sets of connected devices to offset or avoid the predicted spending increase.

Figure 7:
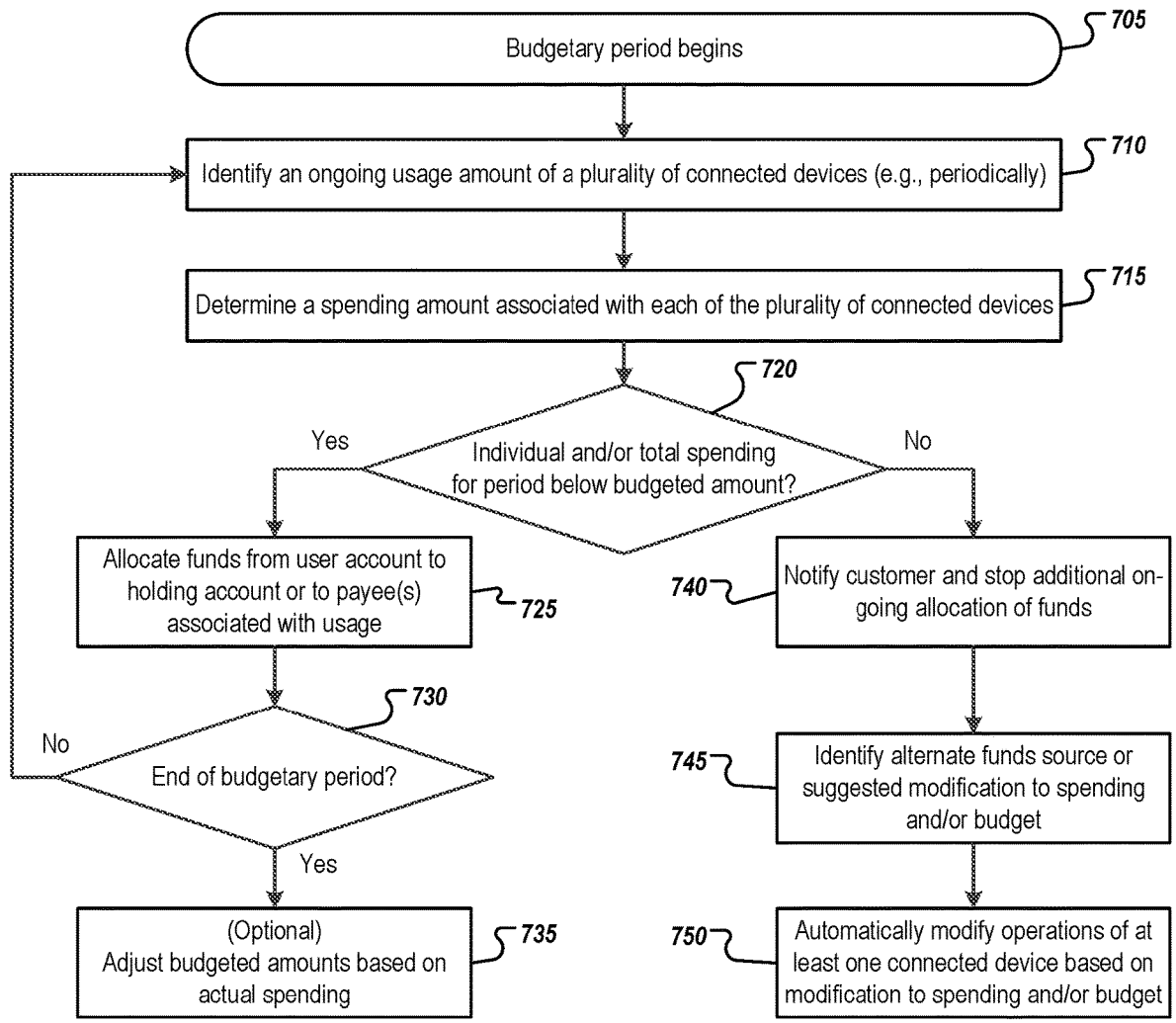
FIG. 7 is a flowchart of an example operation for allocating funds to a holding account in real- or near-real-time based on monitored spending associated with a plurality of connected devices.

FIG. 7 is a flowchart of an example operation 700 for allocating funds to a holding account in real- or near-real-time based on monitored spending associated with a plurality of connected devices. Specifically, method 700 can allocate funds to the holding account based on a set of monitored usage and actual spending. The allocation can be performed in real-time, periodically during the budgetary period, or in response to particular events (e.g., upon reaching particular levels of actual spending, for example, every $500 of spending is allocated). For clarity of presentation, the description that follows generally describes method 700 in the context of the system 100 illustrated in FIG. 1. However, it will be understood that method 700 may be performed, for example, by any other suitable system, environment, software, and hardware, or a combination of systems, environments, software, and hardware as appropriate. Additionally, operations associated with any of the other described methods may be performed concurrently with the operations described here with regard to method 700. Alternatively, method 700 may be performed in systems without performing the other described methods, or derivations therefrom.

At 705, a budgetary period associated with the pre-authorized payments and fund transfers to the holding account begins. In the current illustration, funds are transferred to the holding account based on monitored usage, not in a lump sum at the beginning of the budgetary period or periodically throughout the period. Instead, spending associated with current monitored usage is estimated, and funds similar to the estimated spending can be moved to the holding account, or in some instances, directly to the payee of a particular bill or bills. At 710, ongoing usage associated with a plurality of connected devices can be identified and/or monitored. In some instances, the ongoing usage may be identified periodically, such as daily, weekly, bi-weekly, or other periods. At 715, an estimated spending amount associated with the usage of the various devices in the plurality of connected devices is determined. The usage and spending may be linked to different bills each paid out of the holding account, such that one or more of an aggregated amount of spending among each of the devices is calculated, various individual spending amounts for each device are calculated, and/or spending associated with related sets of connected devices are calculated. The calculations can be based on how bills are generated and with which devices those bills are related to and influenced.

At 720, a determination of whether the spending for the entire budgetary period, or for the current pro-rated portion of the budgetary period where the calculation is performed prior to the end of the period, is higher than or lower than the expected spending amount. Where the actual spending is lower than the estimated spending, method 700 continues at 725, where funds corresponding to the actual spend are allocated or transferred to the holding account of the customer. Alternatively, the funds may be transferred to the payee of particular bills to pay in near real-time, thereby reducing the amount to be owed on the bills at the end of the budgetary period. In some instances, the determination of 720 and the allocation or transfer of funds at 725 can be performed in response to the monitoring and determination of the actual usage and/or spending, including on a periodic basis, in real- or near real-time, or in response to particular usage and/or spending events. In doing so, the allocation can be made as usage and spending are identified, without the need to dedicate funds to the holding account that have not already been spent, thereby avoiding reserve overages in the holding account where they are not necessary. At 730, a determination is made as to whether the budgetary period is over. If not, method 700 returns to 710, as a next amount of usage associated with the connected devices is identified and/or monitored and the process continues again. If, however, the budgetary period is over, method 700 continues at 735, where, if necessary, budgeted amounts for particular estimated spending can be adjusted based on the actual spend to better reflect the estimated spend for the next budgetary period. In some instances, even where the budgetary period is not over at 730, estimated spending within the current budgetary may be adjusted, where appropriate.

Returning to 720, if it is determined that the actual spending is higher than the estimated spending, method 700 continues at 740. Again it is noted that the determination may be based on actual spending and estimated spending associated with only a portion of the budgetary period, such as a week of monitored and calculated spending at the beginning of a month-long budgetary period. Such determinations can allow higher spending to be addressed earlier within the budgetary period as opposed to at the end of the budgetary period when no current recourse is possible.

At 740, upon determining actual spending exceeds expected spending, the customer can be notified and additional allocation of funds to the holding account can be stopped or paused. At 745, an alternate fund source to be used for the payment of the bills and the allocation of funds may be identified. Alternatively, one or more modifications to spending, usage, and/or the budget may be proposed and/or implemented in an effort to offset the increased actual spending. In still another alternative, a set of partial payments that are to be made can be determined, where the partial payments of the bills associated with the holding account may be based on a priority or importance associated with each bill. Some bills may be paid in full, while others are not paid or paid in part but less than the entire amount. In some instances, at 750, operations of at least one connected device may be automatically modified based on the identified modification such that total estimated spending for the rest of the budgetary period may be brought closer to or under the original budget. In some instances, method 700 may then return to 710 to continue to perform ongoing monitoring of the usage of the plurality of connected devices.

In some instances, rewards and/or loyalty points may be provided in response to one or more of the determinations associated with the illustrated systems described above. For example, a financial institution may offer discounts, enhanced rates, charitable donations, or other incentives in an effort to encourage customers to maintain spending and usage within the budget to avoid possible overages in various budgetary periods. Alternatively, the financial institution may partner with one or more providers, where recommendations to reduce spending include suggestions to change to (or stay with) particular providers, where electing to use that particular provider results in incentives from the particular provider and/or the financial institution. These offers and incentives can be used to impact customer behavior, resulting in better relations to the financial institution managing or providing the described systems.

Figure 8:
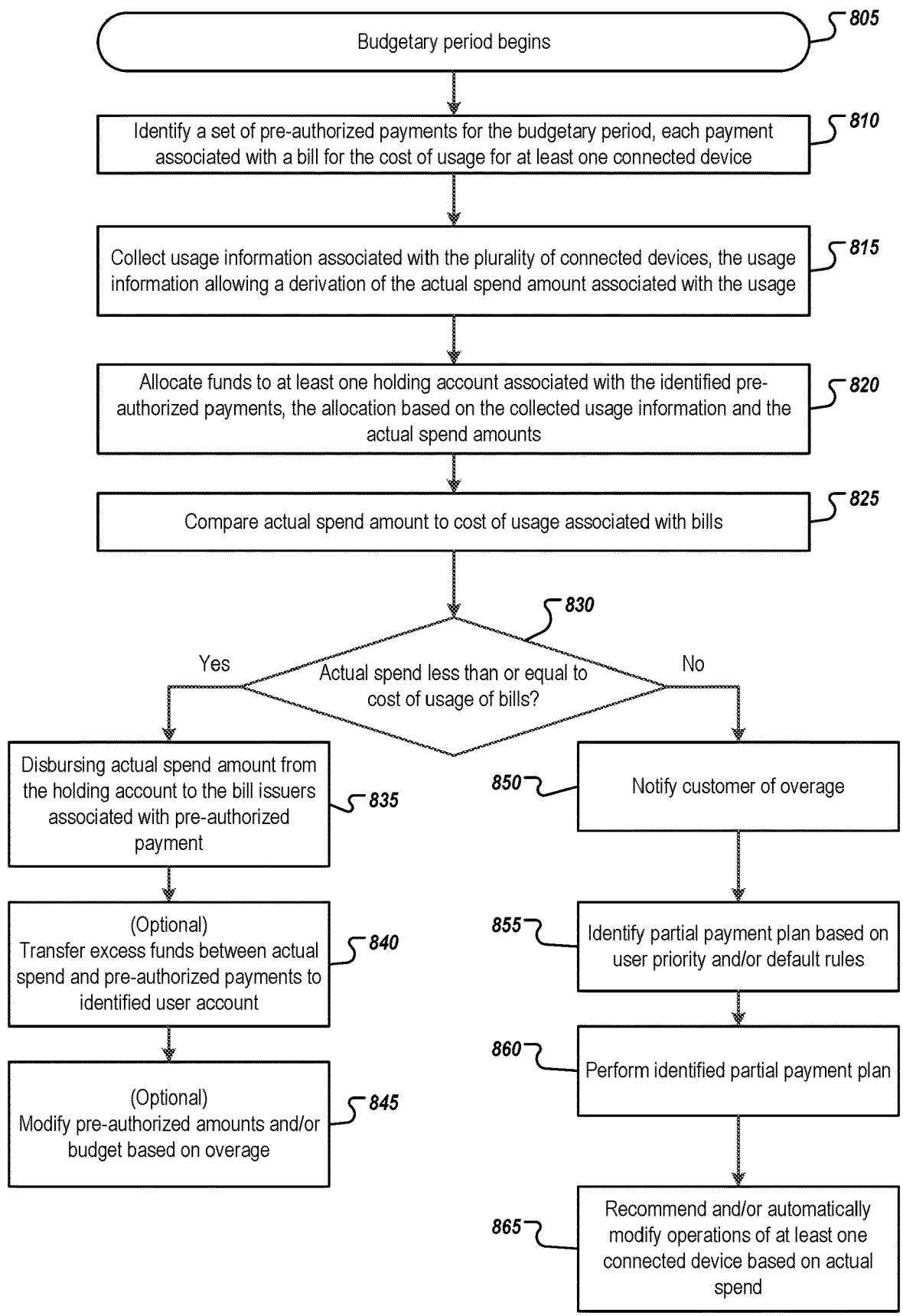
FIG. 8 is a flowchart of an alternative example operation for allocating funds to a holding account in real- or near-real-time based on monitored spending associated with a plurality of connected devices.

FIG. 8 is a flowchart of an alternative example operation for allocating funds to a holding account in real- or near-real-time based on monitored usage and/or spending associated with a plurality of connected devices. Specifically, method 800 can allocate funds to the holding account based on and as usage of one or more connected devices causes an actual spend of funds corresponding to various bills. Similar to method 700, the allocation can be performed in real-time, periodically during the budgetary period, or in response to particular events (e.g., upon reaching particular levels of actual spending, for example, every $500 of spending is allocated). For clarity of presentation, the description that follows generally describes method 800 in the context of the system 100 illustrated in FIG. 1. However, it will be understood that method 800 may be performed, for example, by any other suitable system, environment, software, and hardware, or a combination of systems, environments, software, and hardware as appropriate. Additionally, operations associated with any of the other described methods may be performed concurrently with the operations described here with regard to method 800. Alternatively, method 800 may be performed in systems without performing the other described methods, or derivations therefrom.

At 805, a budgetary period associated with the pre-authorized payments and fund transfers to the holding account begins. In the current illustration, funds are transferred to the holding account based on monitored usage, not in a lump sum at the beginning of the budgetary period or periodically throughout the period. Instead, spending associated with current monitored usage is estimated (e.g., based on a known price per usage rate), and funds similar to the estimated spending can be moved to the holding account, or in some instances, directly to the payee of a particular bill or bills. At 810, a set of pre-authorized payments for the budgetary period can be identified, where each payment is associated with a bill (and corresponding bill issuer) for the cost of usage for at least one connected device. In some instances, particular bills may combine usage costs associated with multiple connected devices, such as an electricity bill which combines usage of a computer, a lamp, a washing machine, and other electrically-powered devices. The pre-authorized payments may be associated with an amount identified in a budget, such as master budget 120. Because the pre-authorized payments are usually within or correspond to the budget, when the customer's usage is within the expected or budgeted amount, sufficient funds for that bill may be assumed, and paid for out of a holding account. At 815, usage information associated with the plurality of connected devices is collected, where the usage information can be used to derive an estimated actual spend amount associated with the usage for various bills (e.g., electricity bill, water bill, etc.). In some instances, the ongoing usage may be identified periodically, such as daily, weekly, bi-weekly, or other periods, while in others, the usage may be monitored in real-time or near-real-time. The estimated spending amount associated with the usage of the various devices in the plurality of connected devices is determined based on the collected usage information. As noted, the monitored usage and spending may be linked to different bills each paid out of the holding account, such that an aggregated amount of spending among each of the devices is calculated, with various individual spending amounts for each device being calculated and aggregated with other devices associated with similar bills. The calculations can be based on how bills are generated and with which devices those bills are related to and influenced.

At 820, funds are allocated to at least one holding account associated with the pre-authorized payments, where the allocation is based on the collected usage information and the actual spend amounts derived or calculated therefrom. The funds can be allocated as the usage amounts are collected (e.g., on the same schedule or in response to collecting the usage), such that funds can be added to the at least one holding account throughout the budgetary period. In some instances, the funds may be allocated on a different schedule than the schedules during which the usage information is collected. For example, while usage information is calculated throughout each day, the allocation may occur once a day, multiple times a week, at the end of every week, or at any other suitable schedule. As noted, one or more holding accounts may be used in certain instances. In other instances, a single holding account may be used with a collected set of allocated funds, where the appropriate actual spent amounts can be transferred to bill issuers for payment and satisfaction of the associated bills.

At 825, the actual spend amount can be compared to the cost of usage associated with the bills and the pre-authorized payment amounts. Based on the comparison, a determination can be made at 830 as to whether the actual spend is less than or equal to cost of usage associated with the bills and the pre-authorized payment amounts. If the actual spend is less than or equal to the cost of usage, method 800 continues at 835, where the actual spend amount is disbursed from the holding account to the appropriate bill issuers. In some instances, the disbursement may be a payment made by the user to the bill issuer, while in others, the disbursement may be pulled from the holding account by the bill issuer as an authorized payor. At 840, any excess funds within the holding account and/or remaining between the pre-authorized amounts and the actual spend can be transferred to any identified user accounts. This transfer may be to a savings account, an investment account, a charitable giving account or organization, or any other suitable location. In some instances, the excess may remain in a checking account of the customer prior to the transfer at 840, where the amount transferred is equal to the remaining portion of a budget associated with the budgeted costs of usage of the plurality of connected devices. When the excess funds remain, those funds can be used to support one or more customer-identified plans or programs to encourage further use and reduced spending. In some instances, at 845, one or more of the pre-authorized amounts and/or a budget associated with the account can be updated to reflect the reduced usage and/or spend, such that the corresponding budget and pre-authorized payment amount reflects a more accurate amount based on the observed usage/spending.

Returning to 830, where the actual spend calculated is more than the cost of usage of the bills and the pre-authorized payment amounts, method 800 continues at 850. At 850, the customer is notified of the overage. At 855, a partial payment plan can be identified, where the partial payment plan may be based on a set of priority rules for performing partial payment of the various bills. The rules may include one or more user-defined priority rules or a set of default rules, where the priority rules are used to determine which bills are to be paid first and in a priority order where available funds can only cover a portion of the amount due for the full set of bills. At 860, the identified partial payment plan can be performed, where funds from the holding account are transferred and disbursed to the bill issuers associated with the bills being covered under the partial payment plan. At 865, one or more modifications to the operations of the various connected devices may be recommended to the customer based on the actual spend over the pre-authorized payment amount. The recommendations may be used to reduce the usage amount (e.g., turn off lights during daytime hours) and/or the actual spend amount (e.g., change electricity plan to a lower rate plan or provider). In some instances, the recommendations may be automatically performed, such that the operations of at least one connected device are changed in light of the overage in spending in an effort to avoid such overages in the future.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

Figure 9:
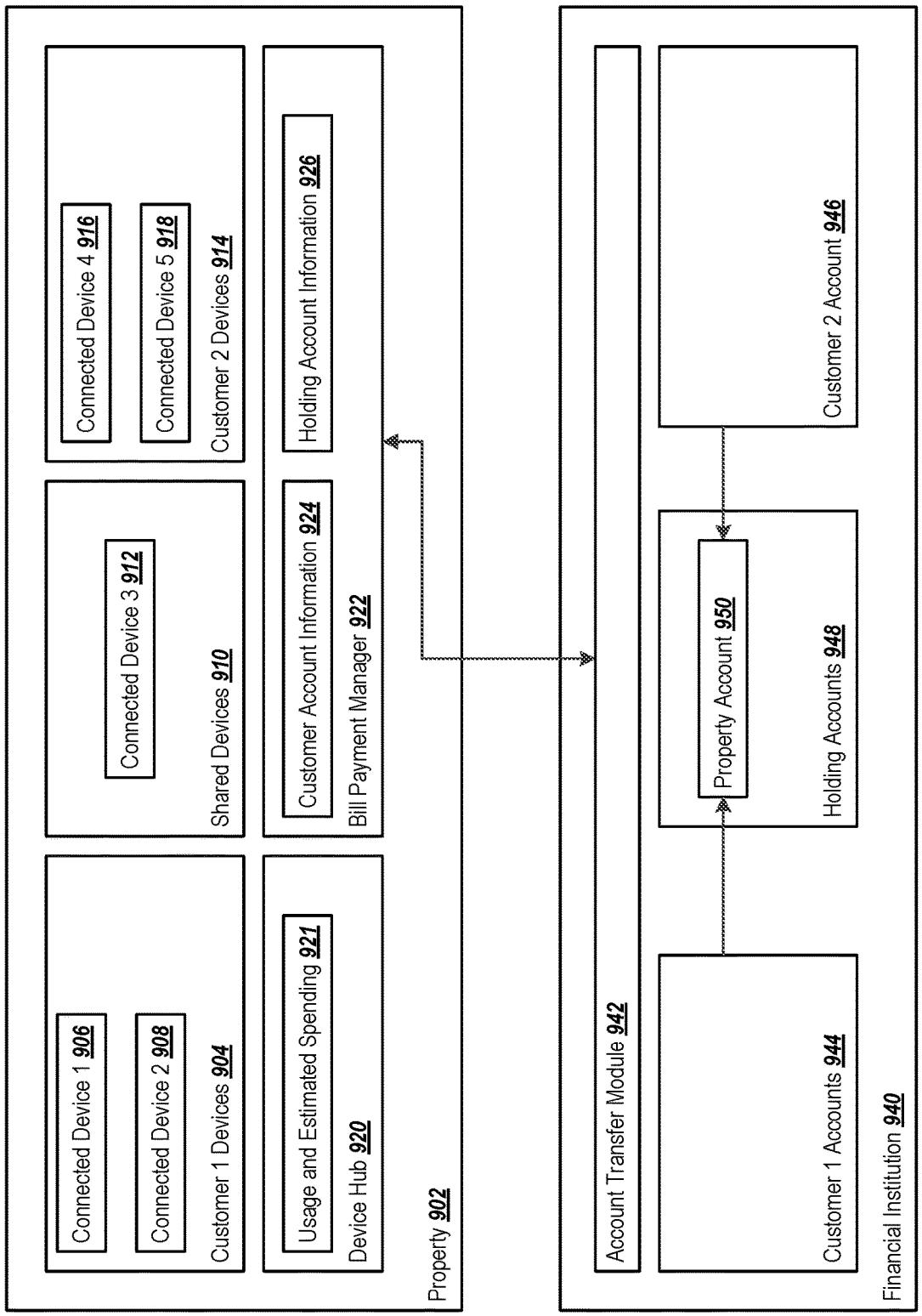
FIG. 9 is an illustration of multiple customers associated with connected devices at a common location or property, where a shared holding account is funded and used to automatically pay bills associated with the location or property.

FIG. 9 is an illustration of a scenario where multiple customers are associated with a set of connected devices at a common location or property, where a shared holding account is funded and used to automatically pay bills associated with the location or property. As illustrated, an example property 902 includes a plurality of connected devices 906, 908, 912, 916, and 918 for which usage is monitored in relation to one or more bill payments. However, property 902 is associated with multiple (two) customers who are each individually responsible for two connected devices each, and who share a fifth connected device 912 among themselves. Additional connected devices may be associated with the property, although only five are illustrated here.

As illustrated, a first customer is associated with a set of first connected devices 904, including connected devices 906 and 908. The second customer is associated with a second set of connected devices 914, including connected device 916 and 918. Those specifically-associated devices may be identified in a setup operation associated with the system as specifically or solely used by the associated customer, such that usage and spending associated with those devices are only attributable to the associated customer. Additionally, the property 902 includes a set of shared devices 910 for which usage and spending is split at a predefined percentage (e.g., 50%) between the two customers living at or associated with the property 902. Here, the set of shared devices 910 includes connected device 912.

As described herein, the device hub 920 can monitor the usage and/or expected or estimated spending 921 associated with each of the connected devices. Each of those devices may be mapped to a particular bill for which the first and second customers are liable for based on their service or utility agreement. The bill payment manager 922 identifies the potential bills to be paid and manages the transfer of funds from accounts associated with the customers based on known customer account information 924. Additionally, information on at least one holding account used for the customers is stored in the holding account information 926. It is noted that while the bill payment manager 922 is illustrated as located at the property 902, the bill payment manager 922 may be a part of the device hub 920 in some instances, located at the financial institution 940 at others, or remotely located and communicably coupled with the illustrated system 900 in others.

The bill payment manager 922, identifying the spending associated with the various connected devices, can identify how spending should be allocated to the different customers. For example, usage and spending associated with connected devices 906 and 908 correspond to the first customer, with usage and spending associated with connected devices 916 and 918 corresponding to the second customer. Usage and spending associated with connected device 912 shared by the customers can be split between the customers as described. Based on the determined usage and spending, the bill payment manager 922 can direct funds from a first customer account 944 and a second customer account 946 to be transferred into one of a plurality of holding accounts 948 specifically associated with the property account 950. In some instances, the bill payment manager 922 can direct an account transfer module 942 to perform the allocation of funds into the property account 950, as needed. In some instances, the amount to be allocated into the property holding account 950 may be based on an estimated usage or spending determined prior to actual usage occurs. In those instances, an estimated spending amount associated with the first customer (i.e., based on the devices and expected usage of those devices associated with the first customer) and an estimated spending amount associated with the second customer (i.e., related to the second customer's usage and estimated spending amount) can be determined an allocated to the property account 950. Once usage and spending is determined during the budgetary period, determinations can be made as to whether usage and/or spending differs from the estimated spending, with adjustments, refunds, or overages acted upon as described above. At the end of the budgetary period, or at periods or times as defined by the system settings, funds in the property holding account 950 can be used to settle bills and pay corresponding payees.

One potential alternative implementation may include a master budget wherein network-connected devices can be associated with different individuals to allow allocation of costs across multiple customers. In this implementation, device usage can be tracked across multiple individuals or entities, allowing those individuals or entities to pay for specific device operations. When coordinating among those individuals or entities, the master budget can be used to manage relatively balanced spending across the group. Additionally, non-connected device costs may be included in the master budget to offset device-based spending. For example, roommates or office coworkers may be assigned to or associated with different connected devices, as well as static or outside costs associated with the space such as rent. Using the master budget, rules may be enforced such that spending is best equalized across the individuals or entities by suggesting operational modifications based, at least in part, on the relative spending of each of the customers. Additionally, if certain devices associated with a particular customer are used more than other devices, those portions of the budget can be assigned to that customer.

In a second potential implementation, the master budget can be associated with and thereby manage actions at two or more locations or spaces. Such instances may include a primary residence and a vacation home, where the master budget is meant to cover usage of both locations. Because the vacation home may not be in use full-time, the budget may be zero or near zero for the vacation home during non-vacation periods where no costs or few costs associated with the vacation home occur. During vacations, the master budget can change (manually or automatically) to turn the primary residence to a reduced spending state while increasing the budget related to the vacation home. This shifting of budgets may be done manually, or the shift may be automatic as the connected devices identify usage at the vacation home and not the primary residence.

The operational modifications described herein may be permanent or temporary modifications. In some instances, the modifications may last for the rest of the budgetary period in which they were made, unless additional changes and savings have occurred such that the temporary modifications can be removed and returned to the pre-modification level. In other instances, some of the modifications may be permanent until removed or changed by the customer. This can allow the customer to elect savings over the initial settings, thereby maintaining the savings over multiple budgetary periods. In some instances, different modifications may be seasonal in length—e.g., changes to the air conditioning in November can be reversed in May as temperatures rise. Further, the master budget itself may seasonally adjust based on historical usage and/or current and upcoming weather forecasts. Similarly, the master budget may be modified and/or adjusted based on any suitable inputs, including weather forecasts, calendaring and schedules, and/or commodity pricing, as appropriate. Referring to FIG. 1, signals providing instructions related to the operational modifications can be sent from any suitable location or component (e.g., the device hub 102, a dedicated bill management module 114, the financial system 160, etc.) to the associated connected device(s) 130. In response to the signals, the operational modifications to the one or more connected devices 130 can be performed.

The present solution can be applied not only in the residential space, but also in a commercial or landlord space as well. For multi-building commercial use, as well as for multi-tenant usage, the master budget may include a primary overall budget and a resident- and/or tenant-specific budget. In other instances, each tenant or resident may be associated with their own master budget, and common areas managed by the landlord or owner will be associated with a master budget, with each person or entity maintaining rules and budgetary settings appropriate for their individual situation.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   at least one processor;
   a non-transitory computer-readable storage medium coupled to the at least one processor and storing expected usage amounts associated with network-connected devices and programming instructions for execution by the at least one processor, the programming instructions instruct the at least one processor to:
   load, from the computer-readable storage medium, an expected usage amount for a plurality of network-connected devices, wherein the expected usage amount for the plurality of network-connected devices is associated with a time period, the time period comprises a budgetary period, the plurality of network-connected devices are associated with at least one bill for the budgetary period, and each bill is associated with a cost of usage corresponding to the actual usage amounts of the connected devices in the plurality of network-connected devices;
   obtain, from at least one data source, information relating to a future event;
   predict, based on a correlation between the future event and usage of at least one network-connected device in the plurality of network-connected devices, a potential change in an expected usage amount for the at least one network-connected device in the plurality of network-connected devices;
   based on the predicted potential change in the expected usage amount for the at least one network-connected device in the plurality of network-connected devices, automatically generate a modified expected usage amount for the plurality of network-connected devices;
   receive, from the plurality of network-connected devices, signals representing actual usage amounts associated with the plurality of network-connected devices;
   compare the actual usage amounts to the modified expected usage amounts for the plurality of network-connected devices;
   determine that the actual usage amounts are higher than the modified expected usage amounts for the plurality of network-connected devices;
   in response to a determination that the actual usage amounts are larger than the modified expected usage amounts for the plurality of network-connected devices, automatically perform operational modifications to one or more network-connected devices in the plurality of network-connected devices, comprising:
      identify a non-essential network-connected device in the plurality of network-connected devices; and
      transmit instructions to the identified non-essential network-connected device to cause a delay in use of the identified non-essential network-connected device until a predetermined time; and
   allocate funds to a holding account associated with the at least one bill, the allocated funds corresponding to the actual usage amounts, wherein the allocated funds are to be automatically disbursed from the holding account to perform payment of the bills in response to the authorization of the at least one payment-related action associated with the plurality of network-connected devices, wherein funds remaining in the holding account after the automatic disbursement are automatically transferred to a savings or retirement account or are maintained in the holding account for the next budgetary period, wherein the funds allocated to the holding account in the next budgetary period are reduced by an amount corresponding to the funds remaining in the holding account after the automatic disbursement.

2. The system of claim 1, the programming instructions further instructing the at least one processor to generate a notification of the actual usage amount exceeding the modified expected usage amount in response to determining that the actual usage exceeds the modified expected usage amount.

3. The system of claim 1, the programming instructions further instructing the at least one processor to, in response to determining that the actual usage amount is higher than the modified expected usage amount:
determine at least one action to reduce the actual usage amount in the next time period; and
present the at least one determined action to reduce the actual usage amount to a user associated with the plurality of network-connected devices.

4. The system of claim 1, wherein the operational modification comprises an operational modification causing a reduction in energy usage.

5. The system of claim 4, where the operational modification causing the reduction in energy usage further comprises a reduction in a power level used by the identified non-essential network-connected device.

6. The system of claim 1, wherein the predetermined time is a time associated with a lower energy cost.

7. The system of claim 1, wherein the at least one data source comprises at least one of an electronic calendar of a customer associated with the at least one network-connected device, a weather forecast, information associated with an upcoming season of weather, or historical information on usage during previous times corresponding to the future time period.

8. The system of claim 6, wherein the potential change in the expected usage amount is associated with a potential change in the costs of the expected usage amount in a future time period, and wherein the potential change in costs is based on a change in costs associated with using the at least one network-connected device, wherein the at least one data source comprises a futures market for a commodity related to the costs associated with using the at least one network-connected device or a rate change by a provider associated with the costs associated with using the at least one network-connected device.

9. The system of claim 1, wherein the identified non-essential network-connected device comprises a network-connected device whose operation is not time-sensitive.

10. A computerized method performed by at least one processor, the method comprising:
loading, from a computer-readable storage medium, an expected usage amount for a plurality of network-connected devices, wherein the expected usage amount for the plurality of network-connected devices is associated with a time period, the time period comprises a budgetary period, the plurality of network-connected devices are associated with at least one bill for the budgetary period, and each bill is associated with a cost of usage corresponding to the actual usage amounts of the connected devices in the plurality of network-connected devices;
obtaining, from at least one data source, information relating to a future event;
predicting, based on a correlation between the future event and usage of at least one network-connected device in the plurality of network-connected devices, a potential change in an expected usage amount for the at least one network-connected device in the plurality of network-connected devices;
based on the predicted potential change in the expected usage amount for the at least one network-connected device in the plurality of network-connected devices, automatically generating a modified expected usage amount for the plurality of network-connected devices;
receiving, from the plurality of network-connected devices, signals representing actual usage amounts associated with the plurality of network-connected devices from at least one network-connected device in the at least one group of network-connected devices;
comparing the actual usage amounts to the modified expected usage amounts for the plurality of network-connected devices;
determining that the actual usage amounts are higher than the modified expected usage amounts for the plurality of network-connected devices;
in response to a determination that the actual usage amounts are larger than the modified expected usage amounts for the plurality of network-connected devices, automatically performing operational modifications to one or more network-connected devices in the plurality of network-connected devices, comprising:
identifying a non-essential network-connected device in the plurality of network-connected devices; and
transmitting instructions to the identified non-essential network-connected device to cause a delay in use of the identified non-essential network-connected device until a predetermined time; and
instructing the at least one processor to allocate funds to a holding account associated with the at least one bill, the allocated funds corresponding to the actual usage amounts, wherein the allocated funds are to be automatically disbursed from the holding account to perform payment of the bills in response to the authorization of the at least one payment-related action associated with the plurality of network-connected devices, wherein funds remaining in the holding account after the automatic disbursement are automatically transferred to a savings or retirement account or are maintained in the holding account for the next budgetary period, wherein the funds allocated to the holding account in the next budgetary period are reduced by an amount corresponding to the funds remaining in the holding account after the automatic disbursement.

11. The method of claim 10, wherein the operational modification comprises an operational modification causing a reduction in energy usage associated with the at least one network-connected device.

12. A non-transitory computer-readable storage medium coupled to the at least one processor and storing expected usage amounts associated with connected devices and programming instructions for execution by the at least one processor, the programming instructions instruct the at least one processor to:
load an expected usage amount for plurality of network-connected devices, wherein the expected usage amount for the plurality of network-connected devices is associated with a time period, the time period comprises a budgetary period, the plurality of network-connected devices are associated with at least one bill for the budgetary period, and each bill is associated with a cost of usage corresponding to the actual usage amounts of the connected devices in the plurality of network-connected devices;

obtain, from at least one data source, information relating to a future event;

predict, based on a correlation between the future event and usage of at least one network-connected device in the plurality of network-connected devices, a potential change in an expected usage amount for the at least one network-connected device in the plurality of network-connected devices;

based on the predicted potential change in the expected usage amount for the at least one network-connected device in the plurality of network-connected devices, automatically generate a modified expected usage amount for the plurality of network-connected devices;

receive, from the plurality of network-connected devices, signals representing actual usage amounts associated with the plurality of network-connected devices;

compare the actual usage amounts to the modified expected usage amount for the plurality of network-connected devices;

determine that the actual usage amounts are larger than the modified expected usage amounts for the plurality of network-connected devices;

in response to a determination that the actual usage amounts are higher than the modified expected usage amounts for the plurality of network-connected devices, automatically perform operational modifications to one or more network-connected devices in the plurality of network-connected devices, comprising:

identify a non-essential network-connected device in the plurality of network-connected devices; and transmit instructions to the identified non-essential network-connected device to cause a delay in use of the identified non-essential network-connected device until a predetermined time; and allocate funds to a holding account associated with the at least one bill, the allocated funds corresponding to the actual usage amounts, wherein the allocated funds are to be automatically disbursed from the holding account to perform payment of the bills in response to the authorization of the at least one payment-related action associated with the plurality of network-connected devices, wherein funds remaining in the holding account after the automatic disbursement are automatically transferred to a savings or retirement account or are maintained in the holding account for the next budgetary period, wherein the funds allocated to the holding account in the next budgetary period are reduced by an amount corresponding to the funds remaining in the holding account after the automatic disbursement.

13. The medium of claim 12, wherein the operational modification comprises an operational modification causing a reduction in energy usage associated with the at least one network-connected device.

* * * * *